(12) United States Patent
Moe et al.

(10) Patent No.: US 10,363,513 B2
(45) Date of Patent: Jul. 30, 2019

(54) METHOD AND APPARATUS FOR FORMING FLUTED FILTRATION MEDIA HAVING TAPERED FLUTES

(75) Inventors: Ted A. Moe, Minneapolis, MN (US); Gregory J. Fesenmaier, Burnsville, MN (US); Gary J. Rocklitz, Burnsville, MN (US); Ming Ouyang, Woodbury, MN (US); Anitha M. Mathew, Kerala (IN)

(73) Assignee: Donaldson Company, Inc., Minneapolis, MN (US)

( * ) Notice: Subject to any disclaimer, the term of this patent is extended or adjusted under 35 U.S.C. 154(b) by 805 days.

(21) Appl. No.: 13/388,956

(22) PCT Filed: Aug. 3, 2010

(86) PCT No.: PCT/US2010/044286
§ 371 (c)(1),
(2), (4) Date: Apr. 18, 2012

(87) PCT Pub. No.: WO2011/017352
PCT Pub. Date: Feb. 10, 2011

(65) Prior Publication Data
US 2012/0196733 A1    Aug. 2, 2012

Related U.S. Application Data

(60) Provisional application No. 61/231,009, filed on Aug. 3, 2009.

(51) Int. Cl.
*B01D 46/00* (2006.01)
*B01D 46/52* (2006.01)
(Continued)

(52) U.S. Cl.
CPC ......... *B01D 46/526* (2013.01); *B01D 25/001* (2013.01); *B01D 25/24* (2013.01);
(Continued)

(58) Field of Classification Search
CPC .... B01D 46/525; B01D 27/005; B01D 25/30; B01D 27/06; B01D 46/522; B01D 46/523; B29C 66/83413; B29C 66/83513
(Continued)

(56) References Cited

U.S. PATENT DOCUMENTS 2,058,669 A    10/1936    Dollinger
2,514,505 A    7/1950    Morton
(Continued)

FOREIGN PATENT DOCUMENTS

CN    1902384    1/2007
DE    3815145    10/1989
(Continued)

OTHER PUBLICATIONS

Communication Pursuant to Article 94(3) EPC for European Patent Application No. 09708023.8, dated May 20, 2014 (5 pages).
(Continued)

*Primary Examiner* — Chelsea E Stinson
(74) *Attorney, Agent, or Firm* — Pauly, DeVries Smith & Deffner LLC

(57) ABSTRACT

A method form forming fluted filtration media is provided. The method includes forming fluted filtration media having a repeating pattern of flutes wherein at least one flute in the repeating pattern of flutes comprises at least one ridge in a flute period between adjacent same side peaks, the flutes showing a tapered cross sectional area.

13 Claims, 13 Drawing Sheets

(51) Int. Cl.
*B01D 25/00* (2006.01)
*B01D 39/16* (2006.01)
*B01D 25/24* (2006.01)

(52) U.S. Cl.
CPC ..... *B01D 39/1623* (2013.01); *B01D 46/0001* (2013.01); *B01D 2239/025* (2013.01); *B01D 2239/1233* (2013.01)

(58) Field of Classification Search
USPC ....... 493/379, 388, 413, 442, 454, 941, 966; 156/250, 462, 474
See application file for complete search history.

(56) References Cited

U.S. PATENT DOCUMENTS

| | | |
|---|---|---|
| 2,514,506 A | 7/1950 | Mueller |
| 2,599,604 A | 6/1952 | Bauer et al. |
| 2,908,350 A | 10/1959 | Buckman |
| 2,960,145 A | 11/1960 | Ruegenberg |
| 2,980,208 A | 4/1961 | Neumann |
| 3,025,963 A | 3/1962 | Bauer |
| 3,053,309 A | 9/1962 | Wilson et al. |
| 3,058,594 A | 10/1962 | Hultgren |
| 3,062,378 A | 11/1962 | Briggs |
| 3,077,148 A * | 2/1963 | Mumby ................ B65H 45/20 425/383 |
| 3,146,197 A | 8/1964 | Getzin |
| 3,198,336 A | 8/1965 | Hyslop |
| 3,372,533 A | 3/1968 | Rummel |
| 3,531,920 A | 10/1970 | Hart |
| 3,799,354 A | 3/1974 | Buckman et al. |
| 3,807,150 A | 4/1974 | Maracle |
| 3,948,712 A | 4/1976 | Stannard |
| 4,102,792 A | 7/1978 | Harris |
| 4,154,688 A | 5/1979 | Pall |
| 4,268,290 A | 5/1981 | Barrington |
| 4,290,889 A | 9/1981 | Erickson |
| 4,310,419 A | 1/1982 | Nara et al. |
| 4,389,315 A | 6/1983 | Crocket |
| 4,410,316 A | 10/1983 | Yoke |
| 4,410,427 A | 10/1983 | Wydeven |
| 4,439,321 A | 3/1984 | Taki et al. |
| 4,452,619 A | 6/1984 | Wright et al. |
| 4,488,966 A | 12/1984 | Schaeffer |
| 4,537,812 A | 8/1985 | Elbers |
| 4,589,983 A | 5/1986 | Wydevan |
| 4,615,804 A | 10/1986 | Wright |
| 4,617,072 A | 10/1986 | Merz |
| 4,652,286 A | 3/1987 | Kusuda |
| 4,732,678 A | 3/1988 | Humbert, Jr. |
| 4,735,720 A | 4/1988 | Kersting |
| 4,766,453 A | 8/1988 | Shiokama et al. |
| 4,925,561 A | 5/1990 | Ishii et al. |
| 4,954,249 A | 9/1990 | Gero et al. |
| 5,002,666 A | 3/1991 | Matsumoto et al. |
| 5,049,326 A | 9/1991 | Matsumoto et al. |
| 5,066,400 A | 11/1991 | Rocklitz et al. |
| 5,080,790 A | 1/1992 | Widmann |
| 5,089,202 A | 2/1992 | Lippold |
| 5,120,296 A * | 6/1992 | Yamaguchi ........... B01D 29/111 493/352 |
| 5,128,039 A | 7/1992 | Gabrielson |
| 5,240,540 A | 8/1993 | Matsumoto et al. |
| 5,262,899 A | 11/1993 | Iizuka |
| 5,274,413 A | 12/1993 | Nomura et al. |
| 5,290,447 A | 3/1994 | Lippold |
| 5,346,519 A | 9/1994 | Williams et al. |
| 5,419,796 A * | 5/1995 | Miller ................ B31F 1/2863 156/207 |
| 5,435,870 A | 7/1995 | Takagaki et al. |
| 5,522,909 A | 6/1996 | Haggard et al. |
| 5,562,825 A | 10/1996 | Yamada et al. |
| 5,591,329 A | 1/1997 | Davidson |
| 5,613,992 A | 3/1997 | Engel |
| 5,766,289 A | 6/1998 | Haggard |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,804,014 A | 9/1998 | Kahler |
| 5,804,073 A | 9/1998 | Horst |
| D399,944 S | 10/1998 | Gillingham et al. |
| 5,820,646 A | 10/1998 | Gillingham et al. |
| 5,851,250 A | 12/1998 | Sugie et al. |
| 5,871,641 A | 2/1999 | Davidson |
| 5,882,288 A | 3/1999 | Paul et al. |
| 5,888,262 A | 3/1999 | Kahler |
| 5,895,574 A | 4/1999 | Friedmann et al. |
| 5,902,364 A | 5/1999 | Tokar et al. |
| 5,904,793 A * | 5/1999 | Gorman ............ A44B 18/0011 156/178 |
| 5,970,609 A | 10/1999 | Shioda |
| 5,987,399 A | 11/1999 | Wegerich et al. |
| 6,039,778 A | 3/2000 | Coulonvaux |
| 6,048,298 A | 4/2000 | Paul et al. |
| D428,128 S | 7/2000 | Gillingham et al. |
| 6,089,761 A | 7/2000 | Sakurai et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,202,038 B1 | 3/2001 | Wegerich et al. |
| 6,210,469 B1 | 4/2001 | Tokar |
| 6,235,195 B1 | 5/2001 | Tokar |
| 6,238,561 B1 | 5/2001 | Liu et al. |
| 6,348,084 B1 | 2/2002 | Gieseke |
| 6,348,085 B1 | 2/2002 | Tokar |
| 6,350,291 B1 | 2/2002 | Gieseke |
| 6,350,296 B1 | 2/2002 | Warner |
| 6,402,800 B1 | 6/2002 | Rey |
| 6,433,748 B1 | 8/2002 | Ekelund et al. |
| 6,517,598 B2 | 2/2003 | Anderson |
| 6,544,310 B2 | 4/2003 | Badeau et al. |
| 6,554,503 B2 | 4/2003 | Imanari et al. |
| 6,582,490 B2 * | 6/2003 | Miller et al. .................... 55/520 |
| 6,598,749 B2 | 7/2003 | Paul et al. |
| 6,610,117 B2 | 8/2003 | Gieseke et al. |
| 6,610,126 B2 | 8/2003 | Xu |
| 6,620,223 B2 | 9/2003 | Bloomer |
| 6,673,136 B2 * | 1/2004 | Gillingham ........ B01D 39/1623 55/302 |
| 6,685,833 B2 * | 2/2004 | Lippold ............... B01D 29/012 210/493.1 |
| 6,743,270 B2 | 6/2004 | Oda et al. |
| 6,746,518 B2 | 6/2004 | Gieseke et al. |
| 6,783,565 B2 | 8/2004 | Gieseke et al. |
| 6,790,397 B2 | 9/2004 | Richerson et al. |
| 6,846,342 B2 | 1/2005 | Mertz et al. |
| 6,848,435 B2 | 2/2005 | Kitamura |
| 6,893,282 B2 | 5/2005 | Schadhauser |
| 6,946,012 B1 | 9/2005 | Miller |
| 6,953,124 B2 | 10/2005 | Winter et al. |
| 6,955,775 B2 | 10/2005 | Chung et al. |
| 6,966,940 B2 | 11/2005 | Krisko et al. |
| 6,986,842 B2 | 1/2006 | Bortnik et al. |
| 7,070,642 B2 | 7/2006 | Scott et al. |
| 7,122,068 B2 | 10/2006 | Tate et al. |
| 7,149,153 B2 | 12/2006 | Meylan |
| 7,166,216 B2 | 1/2007 | Woodard, Jr. et al. |
| 7,213,595 B2 | 5/2007 | Capon et al. |
| 7,235,115 B2 | 6/2007 | Duffy |
| 7,258,719 B2 | 8/2007 | Miller et al. |
| 7,270,693 B2 | 9/2007 | Chung et al. |
| 7,311,747 B2 | 12/2007 | Adamek et al. |
| 7,329,326 B2 | 2/2008 | Wagner et al. |
| 7,396,375 B2 | 7/2008 | Nepsund |
| 7,396,376 B2 | 7/2008 | Schrage et al. |
| 7,425,227 B1 | 9/2008 | Hutchison et al. |
| 7,438,812 B2 | 10/2008 | Denton et al. |
| 7,488,365 B2 | 2/2009 | Golden et al. |
| 7,556,663 B2 | 7/2009 | Niakan |
| 7,588,619 B2 | 9/2009 | Chilton |
| 7,622,063 B2 | 11/2009 | Brandner et al. |
| 7,625,419 B2 | 12/2009 | Nelson et al. |

(56) References Cited

U.S. PATENT DOCUMENTS

| | | |
|---|---|---|
| 7,661,540 B2 | 2/2010 | Choi |
| 7,754,041 B2 | 7/2010 | Brandner et al. |
| 7,927,393 B2 | 4/2011 | Sanami |
| 7,959,702 B2 | 6/2011 | Rocklitz et al. |
| 7,997,425 B2 | 8/2011 | Golden et al. |
| 8,034,145 B2 | 10/2011 | Bohers et al. |
| 8,042,694 B2 | 10/2011 | Driml et al. |
| 8,226,786 B2 * | 7/2012 | Schrage ............... B01D 25/001 156/194 |
| 8,241,384 B2 | 8/2012 | Murphy et al. |
| 8,268,053 B2 | 9/2012 | Risch et al. |
| 8,277,532 B2 | 10/2012 | Osendorf et al. |
| 8,292,983 B2 | 10/2012 | Reichter et al. |
| 8,361,183 B2 | 1/2013 | Rocklitz et al. |
| 8,397,920 B2 | 3/2013 | Moy et al. |
| 8,409,316 B2 | 4/2013 | Nelson et al. |
| 8,460,442 B2 | 6/2013 | Risch et al. |
| 8,496,723 B2 | 7/2013 | Osendorf et al. |
| 8,512,499 B2 | 8/2013 | Golden et al. |
| 8,545,589 B2 | 10/2013 | Rocklitz |
| 8,673,196 B2 | 3/2014 | Treier et al. |
| 8,685,128 B2 | 4/2014 | Murphy et al. |
| 8,734,557 B2 | 5/2014 | Rocklitz et al. |
| 8,814,972 B2 | 8/2014 | Waibel et al. |
| 8,961,722 B2 | 2/2015 | Murphy et al. |
| 9,084,957 B2 | 7/2015 | Rocklitz |
| 9,103,470 B2 * | 8/2015 | Cik ..................... A47C 5/005 |
| 9,433,884 B2 | 9/2016 | Rocklitz et al. |
| 9,517,430 B2 | 12/2016 | Rocklitz et al. |
| 9,808,752 B2 | 11/2017 | Moe et al. |
| 9,855,519 B2 | 1/2018 | Rocklitz |
| 10,058,812 B2 | 8/2018 | Rocklitz |
| 2002/0046654 A1 | 4/2002 | Bloomer |
| 2002/0060183 A1 | 5/2002 | Paul et al. |
| 2002/0108359 A1 | 8/2002 | Powell |
| 2002/0174770 A1 | 11/2002 | Badeau et al. |
| 2003/0056479 A1 | 3/2003 | Lemaster |
| 2003/0075500 A1 | 4/2003 | Kleingünther et al. |
| 2003/0121845 A1 | 7/2003 | Wagner et al. |
| 2004/0060861 A1 | 4/2004 | Winter et al. |
| 2005/0139544 A1 | 6/2005 | Choi |
| 2005/0144916 A1 | 7/2005 | Adamek et al. |
| 2005/0166561 A1 | 8/2005 | Schrage |
| 2005/0217226 A1 | 10/2005 | Sundet et al. |
| 2005/0223687 A1 | 10/2005 | Miller et al. |
| 2005/0252182 A1 | 11/2005 | Golden et al. |
| 2006/0005518 A1 | 1/2006 | Duffy et al. |
| 2006/0021926 A1 | 2/2006 | Woodard |
| 2006/0042209 A1 | 3/2006 | Dallas et al. |
| 2006/0042210 A1 | 3/2006 | Dallas et al. |
| 2006/0091066 A1 | 5/2006 | Driml et al. |
| 2006/0091084 A1 | 5/2006 | Merritt et al. |
| 2006/0151383 A1 | 7/2006 | Choi |
| 2006/0163150 A1 * | 7/2006 | Golden ................ B01D 25/001 210/493.1 |
| 2006/0246260 A1 | 11/2006 | Sundet et al. |
| 2006/0272305 A1 | 12/2006 | Morgan |
| 2007/0039296 A1 * | 2/2007 | Schrage ............... B01D 25/001 55/497 |
| 2007/0251634 A1 | 11/2007 | Choi |
| 2008/0022643 A1 | 1/2008 | Fox et al. |
| 2008/0209875 A1 | 9/2008 | Treier et al. |
| 2008/0216654 A1 | 9/2008 | Wagner et al. |
| 2008/0282890 A1 * | 11/2008 | Rocklitz ............... B01D 46/522 95/273 |
| 2009/0102094 A1 | 4/2009 | Golden et al. |
| 2009/0127211 A1 * | 5/2009 | Rocklitz ............... B01D 46/525 210/767 |
| 2009/0211696 A1 | 8/2009 | Moe et al. |
| 2009/0302390 A1 * | 12/2009 | Van Dal .......... H01L 21/823835 257/369 |
| 2010/0032365 A1 | 2/2010 | Moe |
| 2010/0078379 A1 * | 4/2010 | Rocklitz ................ B01D 25/26 210/493.1 |
| 2011/0277431 A1 | 5/2011 | Rocklitz et al. |
| 2011/0186504 A1 | 8/2011 | Rocklitz |
| 2012/0312167 A1 | 12/2012 | Wagner et al. |
| 2013/0228077 A1 | 9/2013 | Rocklitz et al. |
| 2014/0182251 A1 | 7/2014 | Rocklitz |
| 2014/0325946 A1 | 11/2014 | Rocklitz et al. |
| 2015/0375142 A1 | 12/2015 | Rocklitz |
| 2018/0214797 A1 | 8/2018 | Rocklitz |

FOREIGN PATENT DOCUMENTS

| | | |
|---|---|---|
| DE | 8910110 | 2/1990 |
| DE | 10113077 | 4/2002 |
| DE | 60033469 | 10/2007 |
| EP | 0504038 | 9/1992 |
| EP | 0522692 | 1/1993 |
| EP | 1595590 | 11/2005 |
| EP | 1681087 | 7/2006 |
| GB | 1336841 | 11/1973 |
| GB | 2395537 | 4/2006 |
| JP | 5982919 | 5/1984 |
| JP | 60071018 | 4/1985 |
| JP | S6071018 | 4/1985 |
| JP | 61011921 | 4/1986 |
| JP | S61200116 | 9/1986 |
| JP | S64085109 | 3/1989 |
| JP | H0112811 | 5/1989 |
| JP | H01163410 | 6/1989 |
| JP | 1-163408 | 11/1989 |
| JP | 2-25009 | 2/1990 |
| JP | 3229230 | 10/1991 |
| JP | H06064709 | 3/1994 |
| JP | 3006350 | 1/1995 |
| JP | 82318413 | 9/1996 |
| JP | 08309138 | 11/1996 |
| JP | 2002113798 | 4/2002 |
| JP | 2002303122 | 10/2002 |
| JP | 2003166446 | 6/2003 |
| WO | 9302769 | 2/1993 |
| WO | 9740918 | 11/1997 |
| WO | 97040918 | 11/1997 |
| WO | 9908771 | 2/1999 |
| WO | 2002049741 | 6/2002 |
| WO | 2003033952 | 4/2003 |
| WO | 2003047722 | 6/2003 |
| WO | 2004007054 | 1/2004 |
| WO | 2004082795 | 9/2004 |
| WO | 2005077487 | 8/2005 |
| WO | 2005082484 | 9/2005 |
| WO | 2005123222 | 12/2005 |
| WO | 2006014941 | 2/2006 |
| WO | 2006017790 | 2/2006 |
| WO | 2006076456 | 7/2006 |
| WO | 2006076479 | 7/2006 |
| WO | 2006132717 | 12/2006 |
| WO | 2007056589 | 5/2007 |
| WO | 2007133635 | 11/2007 |
| WO | 08095196 | 8/2008 |
| WO | 2009003119 | 12/2008 |
| WO | 2009100067 | 8/2009 |
| WO | 2010011910 | 1/2010 |
| WO | 2011017352 | 2/2011 |
| WO | 2011091432 | 7/2011 |

OTHER PUBLICATIONS

Office Action for JP Application No. 2012-523711, English translation, dated Jul. 1, 2014 (2 pages).

Office Action for MX Application No. MX/a/2010/008530, dated Jul. 10, 2014 (3 pages).

Final Office Action for U.S. Appl. No. 12/322,616, dated Jul. 19, 2013 (9 pages).

Amendment and Response filed, with RCE, to Final Office Action for U.S. Appl. No. 12/322,616, dated Dec. 19, 2013 (12 pages).

First Office Action from CN Application No. 201080037254.0, dated Oct. 29, 2013 (11 pages).

Non-Final Office Action for U.S. Appl. No. 12/322,616, dated Jan. 16, 2014 (14 pages).

(56) References Cited

OTHER PUBLICATIONS

Office Action for Mexican Patent Application No. MX/a/2010/008530, dated Dec. 3, 2013 (2 pages).
Examiners Report from CA Application No. 2676825, dated Sep. 11, 2013, 3 pages.
Figures 1-6 from Japanese Patent JP2-129231, dated Oct. 2002, 3 pages.
File History for co-pending U.S. Appl. No. 12/215,718, (downloaded from USPTO Website Dec. 8, 2014), 214 pages.
File History for co-pending U.S. Appl. No. 12/322,616 (downloaded from USPTO Website Dec. 16, 2014), 258 pages.
File History for co-pending U.S. Appl. No. 12/508,944 (downloaded from USPTO Website Dec. 8, 2014), 213 pages.
File History for co-pending U.S. Appl. No. 13/013,631 (downloaded from USPTO Website Jan. 6, 2015), 296 pages.
File History for co-pending U.S. Appl. No. 13/110,742 (downloaded from USPTO Website Dec. 8, 2014), 148 pages.
File History for co-pending U.S. Appl. No. 13/744,200, (downloaded from USPTO Website Dec. 8, 2014), 126 pages.
File History for co-pending U.S. Appl. No. 14/040,929, downloaded Jan. 16, 2015, 147 pages.
File History for related U.S. Appl. No. 12/012,785, downloaded Dec. 8, 2014, 103 pages.
File History from related European Application Serial No. 08714184.2-2113, now Issued EP Patent No. 2117672, (downloaded from EPO Register Nov. 25, 2014), 152 pages.
File History from related European Application Serial No. 08781029.7-1365, now Issued EP Patent No. 2170488, (downloaded from EPO Register Nov. 25, 2014), 134 pages.
File History from related European Application Serial No. 09708023.8, (downloaded from EPO Register Dec. 31, 2014), 40 pages.
File History from related European Application Serial No. 09790799.2, (downloaded from EPO Register Feb. 3, 2015) 148 pages.
File History from related European Application Serial No. 10807046.7-1356, (downloaded from EPO Register Dec. 31, 2014), 33 pages.
File History from related European Application Serial No. 11703321.7, (downloaded from EPO Register Dec. 31, 2014), 50 pages.
File History from related European Application Serial No. 12163091.7, (downloaded from EPO Register Feb. 3, 2015), 127 pages.
File History from related European Application Serial No. 12163098.2-1356, (downloaded from EPO Register Feb. 3, 2015), 132 pages.
File History from related European Application Serial No. 12163105.5-1356, (downloaded from EPO Register Feb. 3, 2015), 130 pages.
File History from related European Application Serial No. 14166293.2, (downloaded from EPO Register Feb. 3, 2015), 117 pages.
First Chinese Office Action Received First Office Action for Chinese Application No. 200880006683.4, dated May 31, 2011, Including English translation, 7 pages.
First Examination Report for India Patent Application No. 3070/KOLNP/2009, dated Aug. 7, 2014 (2 pages).
First Examiner Report from Australian Application No. 2008268271, dated Feb. 24, 2012, 2 pages.
First Office Action for Application Serial No. 200980131774.5, dated Mar. 20, 2013, with English translation (14 pages).
First Office Action for Chinese Application No. 200880104082.7, dated Aug. 9, 2013 (7 pages) with English translation.
First Office Action for Chinese Patent Application No. 201180011588.5, (with English translation) dated Mar. 4, 2014 (30 pages).
First Office Action for Chinese Patent Application No. 201220181182.8, dated Feb. 21, 2014 (16 pages) with English translation.
First Office Action for Chinese Patent Application No. 201210180467.X, dated Jan. 28, 2014 (10 pages) with English translation.
First Office Action for Chinese Patent Application No. 201210181810.2 dated Jan. 10, 2014 (8 pages) with English translation.
First Office Action Received for Australian Application No. 2008210304, dated Nov. 23, 2011 (2 pages).
International Preliminary Report on Patentability from International Application No. PCT/US2008/068394, dated Jan. 14, 2010 (9 pages).
International Search Report and Written Opinion from International Application No. PCT/US2008/052961, dated Jun. 11, 2008 (13 pages).
International Search Report and Written Opinion from International Application No. PCT/US2008/068394, dated Oct. 7, 2008, (11 pages).
Non Final Office Action for Chinese Patent Application No. 201210181810.2, dated Feb. 10, 2015 (13 pages) with English translation.
Non-Final Office Action for Japanese Application No. 2011-520223, dated Jun. 4, 2013, with English translation (5 pages).
PCT International Search Report and Written Opinion from International Application No. PCT/US2009/051670, dated Feb. 9, 2010, 26 pages.
PCT International Search Report and Written Opinion from International Application No. PCT/US2011/022446, dated Apr. 5, 2011, 15 pages.
PCT Notification Concerning Transmittal of International Preliminary Report on from International Application No. PCT/US2011/022446, dated Aug. 9, 2012, 12 pages.
PCT Notification Concerning Transmittal of International Preliminary Report on Patentability from International Application No. PCT/US2009/051670, dated Feb. 3, 2011, 15 pages.
Response and RCE filed in co-pending U.S. Appl. No. 12/322,616, submitted to USPTO Feb. 17, 2015, (11 pages).
Response and RCE filed in co-pending Application Serial No. 13/0136,631, submitted to USPTO Feb. 19, 2015, (13 pages).
Response to Communication Pursuant to Article 94(3) EPC for European Patent Application No. 11703321.7, mailed Mar. 7, 2014 and filed with the EPO Sep. 17, 2014 (6 pages).
Response to Final Office Action dated Nov. 14, 2014 in co-pending U.S. Appl. No. 12/508,944, submitted to USPTO dated Feb. 17, 2015, (8 pages).
Response to First Office Action from JP Application No. 2010-515132, dated Sep. 19, 2012, (11 pages) Including English translation of claim amendments.
Second Non-Final Office Action for Chinese Patent Application No. 201180011588.5, dated Dec. 25, 2014 (9 pages) with English translation.
Second Office Action for Chinese Patent Application No. 200880104082.7, dated Mar. 11, 2014 (49 pages) with English translation.
Second Office Action for Chinese Patent Application No. 200980131774.5, dated Jan. 24, 2014 (12 pages) including English translation.
Second Office Action for Chinese Patent Application No. 201080037254.0, dated Nov. 15, 2014 (15 pages) with English translation.
Second Office Action for Chinese Patent Application No. 201210180467.X, dated Nov. 2, 2014 (7 pages) with English translation.
Second Office Action for Chinese Patent Application No. 201210181182.8, dated Dec. 9, 2014 (6 pages) with English translation.
Third Office Action for Chinese Patent Application No. 200980131774.5, dated Jan. 16, 2015 (15 pages) with English translation.
Translation of Final Rejection for Japanese Patent Application No. 2011520223, dated Sep. 2, 2014, 2 pages.
Translation of Mexican Office Action Received, MX Application No. MX/a/2009/008242, dated Jun. 8, 2012, 1 page.
Translation of Non-Final Office Action for Mexican Patent Application No. MX/a/2011/000965, dated Apr. 27, 2014 (2 pages).
Translation of Office Action for Mexican Patent Application No. MX/2010/008530, dated Jan. 30, 2015 (3 pages).
Translation of Office Action from Mexican Application No. MX/a/2009/014134 dated Apr. 19, 2012 (3 pages).
Translation of Second Office Action for Mexican Patent Application No. MX/a/2011/000965, dated Nov. 6, 2014 (2 pages).
Type 101 Automatic Corrugator, Solent Technology Deep Pleating Equipment http://www.solentech.com/html/101_info.html Dec. 23, 2009, 1 page.
Type 102 Computerized Pleating System, Solent Technology Deep Pleating Equipment http://www.solentech.com/html/102_info.html Dec. 23, 2009, 1 page.
Type 103 Box Pleater, Solent Technology Deep Pleating Equipment http://www.solentech.com/html/103_info.html Dec. 23, 2009, 1 page.

(56) References Cited

OTHER PUBLICATIONS

Type 104 Blade Pleater, Solent Technology Deep Pleating Equipment http://www.solentech.com/html/104_info.html Dec. 23, 2009, 1 page.
Type 106 Dedicated Pleating System, Solent Technology Deep Pleating Equipment http://www.solentech.com/html/106_info.html Dec. 23, 2009, 1 page.
Type 202 Computerized Pleating System, Solent Technology Deep Pleating Equipment http://www.solentech.com/html/202_info.html Dec. 23, 2009, 1 page.
Communication Pursuant to Rules 161(1) and 162 EPC, for European Application No. 09708023.8, PCT/US2009/032965, mailed Oct. 27, 2010 (2 pages).
Communication Pursuant to Rules 161(2) and 162 EPC, for European Application No. 10807046.7, PCT/US1010/044286, mailed Apr. 3, 2012 (2 pages).
Examiner Report, for European Application No. 09708023.8, Corresponding Application 12322616, dated Dec. 4, 2012 (3 pages).
Extended European Search Report, for European Application No. 10807046.7, PCT/US2010/044286, dated Jan. 16, 2013 (11 pages).
Final Office Action, dated Mar. 15, 2012 in co-pending U.S. Appl. No. 12/322,616, Method and Apparatus for Forming Fluted Filtration Media, (20 pages).
Final Rejection, for Chinese Application No. 200980103965.0, dated May 14, 2013 (8 pages).
First Office Action, from CN Application No. 200980103965.0, dated Jul. 20, 2012, (11 pages).
International Preliminary Report on Patentability, for International Application No. PCT/US2009/032965 dated Aug. 10, 2010 (9 pages).
International Preliminary Report on Patentability, from International Application No. PCT/US2010/044286, corresponding to U.S. Patent Application No., dated Feb 16, 2012, pp. 1-6.
International Search Report and Written Opinion, for International Application No. PCT/US2009/032965, dated May 18, 2009 (13 pages).
International Search Report and Written Opinion, from International Application No. PCT/US2010/044286 corresponding to U.S. Appl. No. 13/388,956, dated Apr. 14, 2011, pp. 1-10.
Non-Final Office Action, dated Aug. 4, 2011 in co-pending U.S. Appl. No. 12/322,616, Method and Apparatus for Forming Fluted Filtration Media, (12 pages).
Non-Final Office Action, for U.S. Appl. No. 12/322,616, dated Dec. 6, 2010 (19 pages).
Non-Final Office Action, dated Nov. 23, 2012 in co-pending U.S. Appl. No. 12/322,616, Method and Apparatus for Forming Fluted Filtration Media, (15 pages).
Office Action, for Mexico Application No. MX/a/2010/008530, dated May 28, 2013 (3 pages).
Response to Final Office Action, for U.S. Appl. No. 12/322,616 dated Mar. 15, 2012 and dated Sep. 17, 2012 (8 pages).
Response to Non-Final Office Action, for U.S. Appl. No. 12/322,616 dated Aug. 4, 2011 and dated Jan. 4, 2012 (8 pages).
Response to Non-Final Office Action, for U.S. Appl. No. 12/322,616 dated Dec. 6, 2010 and dated Jun. 6, 2011 (10 pages).
Response to Non-Final Office Action, for U.S. Appl. No. 12/322,616, dated Nov. 23, 2012 and dated Apr. 23, 2013 (11 pages).
Final Rejection for Chinese Patent Application No. 201080037254.0, dated Mar. 30, 2015 (15 pages) with English translation.
First Examiner's Report for Australian Patent Application No. 2013270543 dated Apr. 23, 2015 (3 pages).
Fourth Office Action for Chinese Patent Application No. 200980131774.5, dated Apr. 29, 2015 (14 pages) with English translation.
Non-Final Office Action for U.S. Appl. No. 13/013,631, dated May 7, 2015 (24 pages).
Office Action for Mexico Patent Application No. MX/a/2011/000965, dated Apr. 28, 2015 (2 pages).
Supplemental Notice of Allowability for U.S. Appl. No. 12/508,944 dated Apr. 9, 2015 (7 pages).

Examiner's Report for Canadian Patent Application No. 2691867, dated Jan. 30, 2015 (3 pages).
Notice of Allowance for U.S. Appl. No. 12/508,944, dated Feb. 27, 2015 (14 pages).
Office Action for Chinese Application No. 200880104082.7, dated Feb. 12, 2015 (6 pages) with English Translation.
Amendment and Response to Non-Final Office Action dated Jan. 14, 2015, filed via EFS-Web dated Jul. 13, 2015, 10 pages.
Communication Pursuant to Article 94(3) EPC for European Patent Application No. 09708023.8, dated Sep. 1, 2015 (5 pages).
Communication Pursuant to Article 94(3) EPC for European Patent Application No. 10807046.7, dated Jul. 29, 2015 (6 pages).
Communication Pursuant to Article 94(3) EPC for European Patent Application No. 11703321.7, dated May 27, 2015 (4 pages).
Communication Pursuant to Article 94(3) EPC for European Patent Application No. 12163091.7, dated Jul. 7, 2015 (5 pages)/.
Communication Pursuant to Article 94(3) EPC for European Patent Application No. 12163098.2, dated Jul. 20, 2015 (5 pages).
Communication Pursuant to Article 94(3) EPC for European Patent Application No. 12163105.5, dated Jul. 3, 2015 (5 pages).
File History for co-pending U.S. Appl. No. 14/198,246 (downloaded from USPTO Website Jun. 26, 2015), 218 pages.
Final Office Action for U.S. Appl. No. 13/013,631 dated Oct. 28, 2015 (20 pages).
First Examination Report for Australian Patent Application No. 2011207507, dated Dec. 1, 2015 (3 pages).
First Examination Report for Indian Patent Application No. 3243/kolnp/2010, dated Oct. 12, 2015 (2 pages).
First Examiner Report for Australian Patent Application No. 2014201109, dated Jul. 20, 2015 (3 pages).
Fourth Office Action for Chinese Patent Application No. 201210180467.X, dated Dec. 29, 2015 (10 pages) with English translation.
Non-Final Office Action for Japanese Patent Application No. 2014-263546, dated Nov. 10, 2015 (5 pages) with English Summary.
Non-Final Office Action for U.S. Appl. No. 12/322,616 dated Oct. 23, 2015 (30 pages).
Non-Final Office Action for U.S. Appl. No. 14/040,929 dated Dec. 8, 2015 (19 pages).
Non-Final Office Action for U.S. Appl. No. 14/198,246, dated Jun. 18, 2015, (32 pages).
Notice of Allowance for U.S. Appl. No. 14/090,929 dated Aug. 13, 2015 (31 pages).
Notification for Patent Reexamination for Chinese Patent Application No. 201080037254.0, dated Oct. 26, 2015 (9 pages) with English translation.
Office Action by the Appeal Examiner for Japanese Patent Application No. 2010-545266, dated Dec. 11, 2015 (3 pages) with English Summary.
Response to Communication Pursuant to Article 94(3) EPC for European Patent Application No. 11703321.7, mailed May 27, 2015, and filed with the EPO Dec. 7, 2015 (9 pages).
Response to Communication Pursuant to Article 94(3) EPC for European Patent Application No. 12163098.2 filed with the EPO on Feb. 1, 2016 (11 pages).
Response to Communication Pursuant to Article 94(3) for European Patent Application No. 12163105.5, mailed Jul. 3, 2015 and filed with the EPO Jan. 13, 2016 (8 pages).
Response to Examiner's Report for Canadian Patent Application No. 2,691,867, mailed and filed with the CIPO Jul. 30, 2015 (86 pages).
Response to First Examination Report for Indian Patent Application No. 283/KOLNP/2010, filed with the IPO dated Dec. 28, 2015 (54 pages).
Second Examiner's Report for Canadian Patent Application No. 2691867, dated Nov. 2, 2015 (3 pages).
Third Non Final Office Action for Chinese Patent Application No. 201180011588.5, dated Jun. 15, 2015 (7 pages) with English translation.
Third Office Action for Chinese Patent Application No. 201210180467.X, dated Jul. 6, 2015 (8 pages) with English translation.
Non Final Office Action for U.S. Appl. No. 14/198,246, dated Mar. 10, 2016 (18 pages).

(56) References Cited

OTHER PUBLICATIONS

Non-Final Office Action for U.S. Appl. No. 12/322,616, dated Mar. 11, 2016 (37 pages).
Non-Final Office Action for U.S. Appl. No. 13/013,631, dated Mar. 28, 2016 (24 pages).
Office Action for Japanese Patent Application No. 2015-043876 dated Mar. 1, 2016 (6 pages) with English translation.
Response to Communication Pursuant to Art 94(3) EPC for European Patent Application No. 09708023.8 filed with the EPO Mar. 11, 2016 (10 pages).
Response to Communication Pursuant to Article 94(3) EPC for European Patent Application No. 10807046.7, filed with the EPO Feb. 8, 2016 (13 pages).
Communication Pursuant to Article 94(3) EPC for European Patent Application No. 12163098.2, mailed Apr. 26, 2016 (5 pages).
Communication Pursuant to Article 94(3) EPC for European Patent Application No. 12163105.5, mailed May 2, 2016 (5 pages).
Final Rejection for Japanese Patent Application No. 2013-232560 dated Jan. 5, 2016 (3 pages) with English Summary.
First Examination Report for India Patent Application No. 283/KOLNP/2010, dated Dec. 30, 2014 (3 pages).
CN Decision by Rexam Board for Chinese Patent Application No. 200980131774.5, mailed Apr. 21, 2017 (15 pages) no English translation available.
Communication Pursuant to Article 94(3) EPC for European Patent Application No. 09708023.8, mailed Feb. 9, 2017 (5 pages).
Communication Pursuant to Article 94(3) EPC for European Patent Application No. 10807046.7 mailed Jan. 31, 2018 (5 pages).
Communication Pursuant to Article 94(3) EPC for European Patent Application No. 10807046.7, mailed Nov. 30, 2016 (5 pages).
Communication Pursuant to Article 94(3) EPC for European Patent Application No. 11703321.7, mailed May 10, 2017 (5 pages).
Communication Pursuant to Article 94(3) EPC for European Patent Application No. 12163091.7 mailed Aug. 2, 2016 (6 pages).
Communication Pursuant to Article 94(3) EPC for European Patent Application No. 12163091.7 mailed Jun. 23, 2017 (5 pages).
Communication Pursuant to Article 94(3) EPC for European Patent Application No. 12163098.2, mailed Jun. 30, 2017 (4 pages).
Communication Pursuant to Article 94(3) EPC for European Patent Application No. 14166293.2 mailed Jul. 20, 2017 (6 pages).
Communication Pursuant to Article 94(3) EPC for European Patent Application No. 14166293.2 mailed Jul. 27, 2016 (4 pages).
Decision of Rejection for Japanese Patent Application No. 2015-043876 dated Jun. 20, 2017 (5 pages) with English translation.
Examination Report for Australian Patent Application No. 2016202520 dated Nov. 21, 2016 (2 pages).
File History for co-pending U.S. Appl. No. 14/708,993 (downloaded from USPTO Website Mar. 6, 2017), 243 pages.
Final Office Action for Chinese Patent Application No. 201510507854.3 dated Oct. 9, 2017 (14 pages) with English translation.
Final Office Action for Japanese Patent Application No. 2015-043876 dated Nov. 8, 2016 (9 pages) with English translation.
Final Office Action for Japanese Patent Application No. 2015-077921 dated Jun. 20, 2017 (8 pages) with English translation.
Final Office Action for U.S. Appl. No. 12/322,616 dated Sep. 22, 2016 (33 pages).
Final Office Action for U.S. Appl. No. 13/013,631 dated Aug. 11, 2016 (25 pages).
Final Office Action for U.S. Appl. No. 13/013,631 dated Feb. 9, 2018 (28 pages).
Final Office Action for U.S. Appl. No. 14/708,993 dated Jun. 9, 2017 (15 pages).
First Office Action for Chinese Patent Application No. 201510507854.3, dated Jun. 28, 2016 (15 pages) with English translation.
First Office Action for Chinese Patent Application No. 201510828027.4 dated Dec. 16, 2016 (14 pages) with English Translation.
First Office Action for Chinese Patent Application No. 201510896382.5 dated Mar. 27, 2017 (17 pages).
Non-Final Office Action for U.S. Appl. No. 13/013,631 dated Aug. 17, 2017 (23 pages).
Non-Final Office Action for U.S. Appl. No. 13/013,631 dated Dec. 23, 2016 (19 pages).
Non-Final Office Action for U.S. Appl. No. 14/708,993 dated Jan. 26, 2017 (38 pages).
Notice of Allowance for U.S. Appl. No. 12/322,616 dated Jul. 6, 2017 (9 pages).
Notice of Allowance for U.S. Appl. No. 13/013,631 dated May 2, 2017 (13 pages).
Notice of Allowance for U.S. Appl. No. 14/198,246 dated Aug. 10, 2016 (12 pages).
Notice of Allowance for U.S. Appl. No. 14/708,993 dated Aug. 14, 2017 (10 pages).
Notice of Opposition for European Patent Application No. 09790799.2 on behalf of MAHLE International GmbH, mailed Sep. 15, 2017 (13 pages) with translation through Google Translate.
Notice of Opposition for European Patent Application No. 09790799.2 on behalf of MANN+HUMMEL International GmbH & Co. KG, mailed Sep. 15, 2017 (45 pages) with translation through Google Translate.
Notification for Patent Reexamination for Chinese Patent Application No. 200980131774.5 mailed Nov. 18, 2016 (16 pages) with English translation.
Office Action for Japanese Patent Application No. 2014114346, dated Aug. 4, 2017 (23 pages) with English translation.
Office Action for Japanese Patent Application No. 2016-233484 dated Sep. 4, 2017 (7 pages) with English translation.
Office Action for Mexican Patent Application No. MX/a/2012/001455 dated May 4, 2017 (3 pages), translation only.
Office Action for Mexican Patent Application No. MX/a/2012/001455 received by the associate dated Dec. 7, 2016 (2 pages), translation only.
Office Action for Mexican Patent Application No. MX/a/2012/001455 received by the associate dated Nov. 14, 2017 (5 pages) with English summary.
Reconsideration Report for Japanese Patent Application No. 2015-043876 dated Dec. 12, 2017 (2 pages), English translation.
Second Office Action for Chinese Patent Application No. 201510507854.3 dated Feb. 13, 2017 (8 pages) with English translation.
Second Office Action for Chinese Patent Application No. 201510828027.4 dated Sep. 11, 2017 (15 pages) with English Translation.
Second Office Action for Chinese Patent Application No. 201510896382.5 dated Nov. 29, 2017 (14 pages) with English translation.
Response to Final Office Action for U.S. Appl. No. 13/013,631, filed Apr. 16, 2018 (11 pages).
Office Action for Japanese Patent Application No. 2016-233484 dated May 7, 2018 (10 pages) with English translation.
Non-Final Office Action for U.S. Appl. No. 15/221,824 dated Sep. 28, 2018 (92 pages).
Office Action for Japanese Patent Application No. 2015-043876 dated Jun. 26, 2018 (15 pages) with English translation.
Response to Non-Final Rejection dated Apr. 19, 2018, for U.S. Appl. No. 15/372,944, submitted via EFS-Web dated Jul. 18, 2018, 10 pages.
Third Office Action for Chinese Patent Application No. 201510896382.5 dated Jul. 12, 2018 (20 pages) with English translation.
Non-Final Office Action for U.S. Appl. No. 15/372,944 dated Apr. 19, 2018 (81 pages).
Communication Pursuant to Article 94(3) EPC for European Patent Application No. 09708023.8 mailed Feb. 9, 2018 (4 pages).
Grounds for Opposition for European Patent Application No. 09790799.2 on behalf of MANN+HUMMEL International GmbH & Co. KG, filed Aug. 22, 2017 (23 pages).
Grounds for Opposition for European Patent Application No. 09790799.2 on behalf of MANN+HUMMEL International GmbH & Co. KG, filed Aug. 23, 2017 (7 pages).
Response to Non Final Office Action for U.S. Appl. No. 13/013,631, filed Nov. 17, 2017 (11 pages).
Final Office Action for U.S. Appl. No. 15/372,944 dated Nov. 2, 2018 (22 pages).

(56) References Cited

OTHER PUBLICATIONS

First Examination Report for Indian Patent Application No. 486/KOLNP/2012 dated Jun. 27, 2018 (9 pages).
Office Action for Japanese Patent Application No. 2015-043876 dated Nov. 13, 2018 (2 pages), English translation.
Response to Final Rejection dated Nov. 2, 2018, for U.S. Appl. No. 15/372,944, submitted via EFS-Web dated Jan. 2, 2019, 9 pages.
Response to Non-Final Rejection dated Sep. 28, 2018, for U.S. Appl. No. 15/221,824, submitted via EFS-Web dated Dec. 28, 2018, 11 pages.
Extended European Search Report for European Patent Application No. 18164621.7 dated Nov. 20, 2018 (8 pages).
First Examination Report for Indian Patent Application No. 2038/KOLNP/2012 dated Jul. 27, 2018 (6 pages).
Fourth Office Action for Chinese Patent Application No. 201510896382.5 dated Jan. 11, 2019 (18 pages) with English Translation.

* cited by examiner

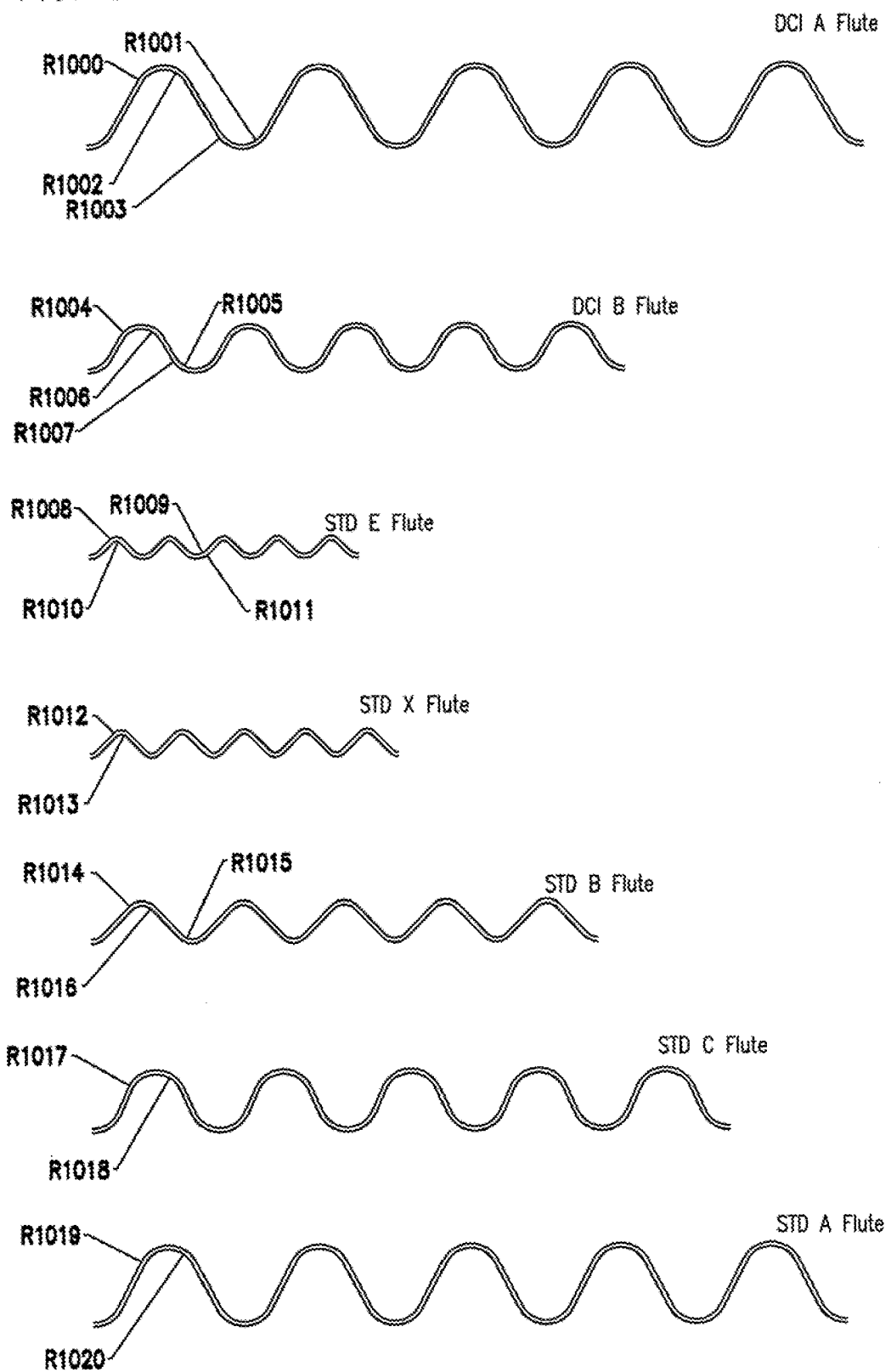

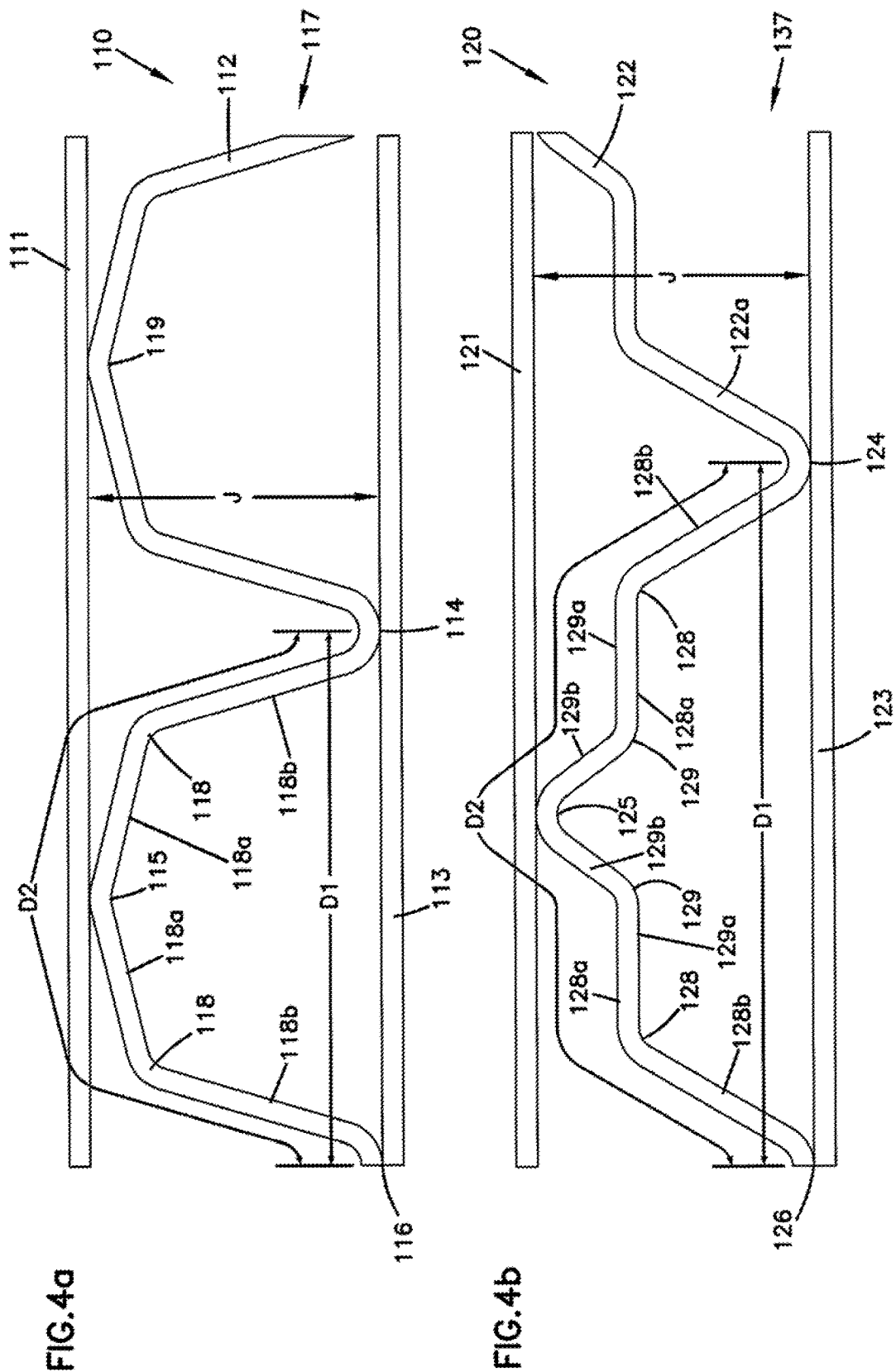

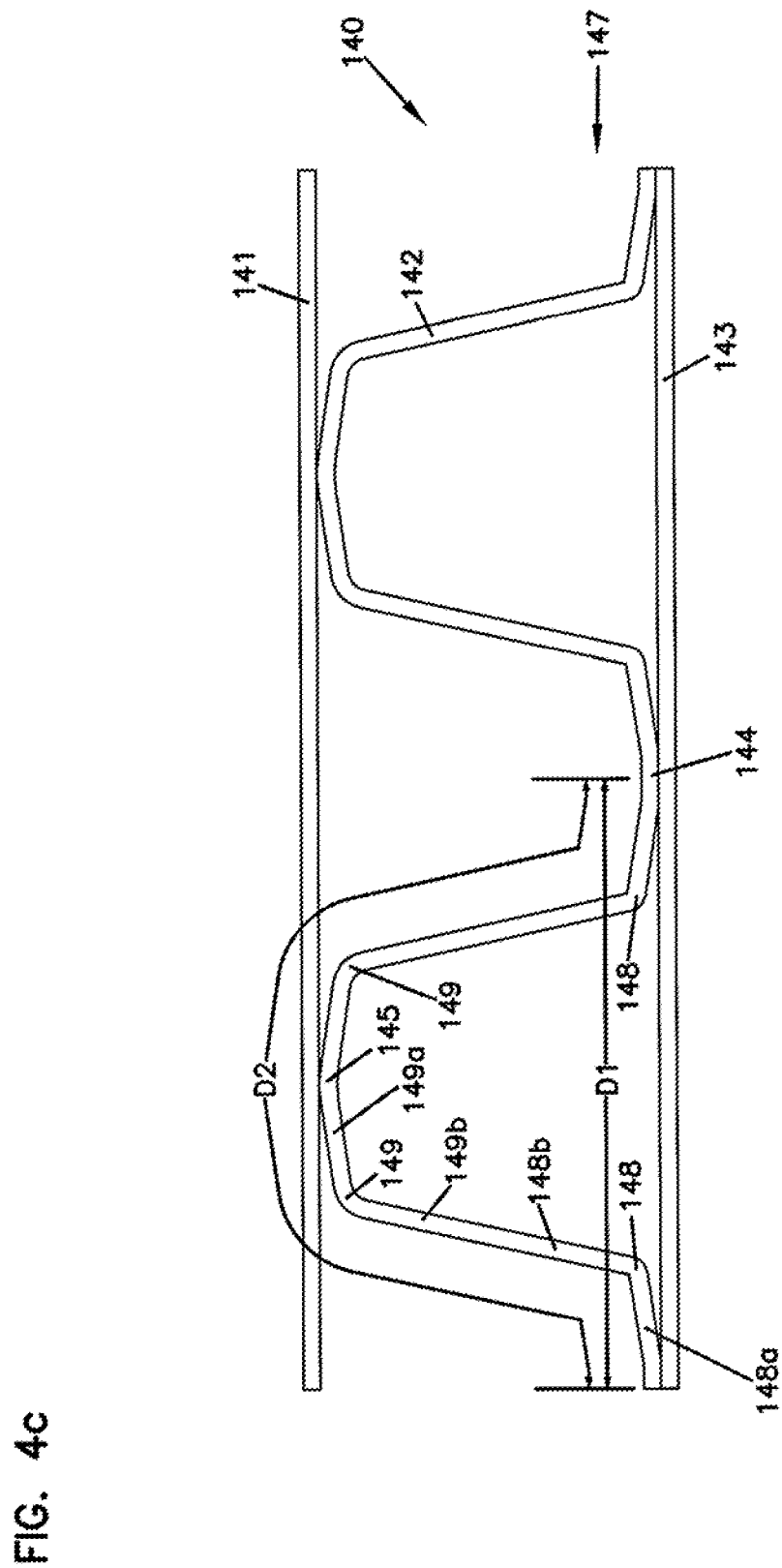

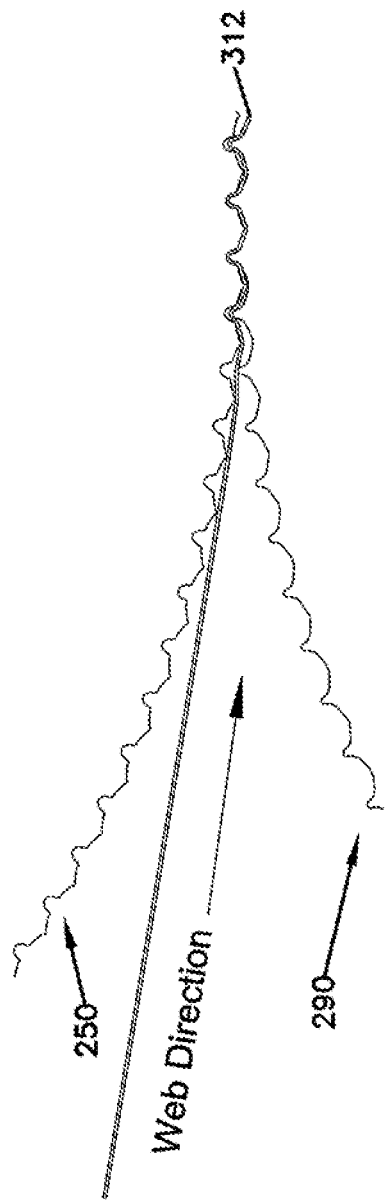

METHOD AND APPARATUS FOR FORMING FLUTED FILTRATION MEDIA HAVING TAPERED FLUTES

This application is being filed as a PCT International Patent application on Aug. 3, 2010, in the name of Donaldson Company, Inc., a U.S. national corporation, applicant for the designation of all countries except the U.S., and Ted A. Moe, a U.S. Citizen, applicant for the designation of the U.S. only; Gregory J. Fesenmaier, a U.S. Citizen, applicant for the designation of the U.S. only; Gary J. Rocklitz, a U.S. Citizen, applicant for the designation of the U.S. only; Ming Ouyang, a U.S. Citizen, applicant for the designation of the U.S. only; and Anitha Mathew, a U.S. Citizen, applicant for the designation of the U.S. only; and claims priority to U.S. Provisional Patent Application Ser. No. 61/231,009, filed Aug. 3, 2009, the contents of which is herein incorporated by reference.

FIELD OF THE INVENTION

The present invention relates to methods and apparatuses for forming fluted filtration media, single facer media, and filtration media packs.

BACKGROUND

Fluid streams, such as air and liquid, carry contaminant material therein, such as gas phase contaminants and liquid and solid particulates. In many instances, it is desired to filter some or all of the contaminant material from the fluid stream. For example, air streams to engines for motorized vehicles or for power generation equipment, air and gas streams to gas turbine systems, air and gas streams to various combustion furnaces, and air and gas streams to heat exchangers (e.g., heating and air conditioning) carry particulate contaminants that should often be filtered. Liquid streams in engine lube systems, hydraulic systems, coolant systems and fuel systems, can also carry contaminants that should be filtered. It is preferred for such systems that selected contaminant material be removed from (or have its level reduced in) the fluid.

A variety of fluid filters (gas or liquid filters) have been developed for contaminant reduction. In general, however, continued improvements are sought. One example of fluid filters that have excellent performance in some implementations are filters containing z-media. Z-media generally refers to a type of fluted filtering media element where a fluid enters flutes on a first face of the media element and exits from flutes at a second face of the media element. In general, the faces on z-media are provided on opposite ends of the media. The fluid enters through open flutes on one face and exits through open flutes on the other face in some embodiments (such as for particulate filtration). At some point between the first face and the second face, the fluid passes from one flute to another flute to provide for filtration.

Existing flute designs for z-media, as well as equipment for making the flutes, are suitable for many implementations. However, improvements are still desired, and are the subject of the present invention.

SUMMARY

The present invention relates to methods and apparatuses for forming fluted filtration media, single facer media, and filtration media packs. The fluted filtration media can be provided as air filtration media, and can include a repeating pattern of flutes having a fluted sheet with at least one ridge provided in a flute period between adjacent same side peaks. The repeating flute pattern can include at least two ridges, at least three ridges, at least four ridges, or more ridges between adjacent same side peaks. An exemplary form of the filtration media can be characterized as z-media.

In typical implementations the flutes are tapered in a fashion such that cross sectional area of the flutes varies along the flute length. In general, filtration media that is tapered can exhibit a first set of flutes that decrease in size from a first end of the media to a second end of the media, and a second set of flutes that increase in size from the first end of the media to the second end of the media. Filtration media that is tapered can also exhibit a first set of flutes that decrease in size from a first end of the media to an intermediate point in the media and have a substantially constant size from the intermediate point in the media to the second end of the media. A second set of flutes can increase in size from the second end of the media to the intermediate point in the media and then have a substantially constant size from the intermediate point in the media to the first end of the media. In such configurations, the total pressure drop can be reduced across the filter, as the filter openings can be maximized both upstream and downstream of the filter.

A method for forming fluted filtration media is also provided according to the present invention. The method includes fluting filtration media to provide media having a repeating pattern of flutes. Generally at least one flute in the repeating pattern of flutes comprises at least one ridge in a flute period between adjacent same side peaks. The repeating pattern of flutes can comprise at least one flute having at least two ridges provided in a flute period between adjacent same side peaks. A ridge can be provided between adjacent peaks. The reference to a "ridge" refers to a line of intersection between differently sloped media portions between flute peaks. The reference to a "ridge" does not include the flute peaks.

The method for forming fluted filtration media can include a step of feeding filtration media into a bite formed by a first roll and a second roll to form the fluted filtration media. The first roll can include a plurality of first roll projections and a plurality of first roll recesses wherein the first roll provides alternating first roll projections and first roll recesses. In general at least one of the first roll projections includes at least two media contact areas separated by a media relaxation area. In some embodiments at least one of the first roll projections comprises at least three media contact areas separated by media relaxation areas.

The second roll comprises a plurality of second roll recesses and second roll projections wherein the second roll provides alternating second roll recesses and second roll projections. At least one of the second roll recesses includes at least two media contact areas separated by a media relaxation area. In general, at least one of the second roll recesses comprises at least three media contact areas separated by media relaxation areas. In an exemplary embodiment, all of the first roll projections and all of the second roll recesses include at least two media contact areas separated by a media relaxation area, and preferably include at least three media contact areas separated by media relaxation areas.

A method for forming single facer media is provided according to the present invention. The method includes attaching (e.g., adhering) the fluted filtration media to a facing sheet to form a single facer media.

A method for forming a filtration media pack is provided according to the invention. The method for forming a filtration media pack can include forming a rolled filtration media pack from single facer media. The rolled filtration media pack can be provided as cylindrical, obround, or race track shaped. The method for forming a filtration media pack can include forming a stacked filtration media pack from single facer media. Forming a stacked filtration media pack includes stacking a plurality of single facer media sheets.

An apparatus for forming fluted filtration media is provided according to the present invention. The apparatus for forming the media and media packs of the invention can include a first roll and a second roll arranged to provide a bite that flutes filtration media fed into the bite and provides the filtration media with a repeating pattern of flutes. The first roll comprises a plurality of first roll projections and a plurality of first roll recesses wherein the first roll provides alternating first roll projections and first roll recesses. At least one of the first roll projections comprises at least two media contact areas separated by a media relaxation area. The second roll comprises a plurality of second roll recesses and a plurality of second roll projections wherein the second roll provides alternating second roll recess and second roll projection. At least one of the second roll recesses includes at least two media contact areas separated by a media relaxation area.

In a conventional corrugating processes, such as a corrugation process used to form A flutes and B flutes (as described below), the corrugation rolls can be considered relatively symmetrical. Relatively symmetrical rolls are rolls where one roll (e.g., the top roll) has teeth and recesses that are similar to the teeth and recesses on the other roll (e.g., the bottom roll). Because the rolls on a conventional corrugation process are symmetrical, the resulting flutes are generally symmetrical. By providing rolls that are non-symmetrical, the performance of the resulting filtration media can be modified.

The present invention uses, in certain implementations, a coining roll and a receiver roll. It will be appreciated that in some implementations the two rolls can have dual functionality such that they serve both coining and receiving functions This allows for more complex flute shapes to be formed by having nips on both rolls (as described below). A coining roll and the receiver roll can be considered non-symmetrical with respect to the structure of the projections or teeth and the recesses. Although the coining and the receiver rolls can be considered symmetrical with respect to period length, the structure of the projections and the recesses are different on the two rolls and, therefore, the rolls can be considered non-symmetrical. In a variety of embodiments, the corrugation rolls are configured such that the resulting media has a substantially equal arc length along the length of the media. Such a configuration can reduce strain exerted on the media during manufacturing.

BRIEF DESCRIPTION OF THE DRAWINGS

FIG. 3 is a schematic view of various corrugated media configurations.

FIGS. 4a-c are enlarged schematic, cross-sectional views of portions of media produced according to example implementations of the invention.

FIG. 12 is an enlarged, partial, sectional view of a bite showing the formation of fluted media according to the present invention.

DETAILED DESCRIPTION

Figure 1:
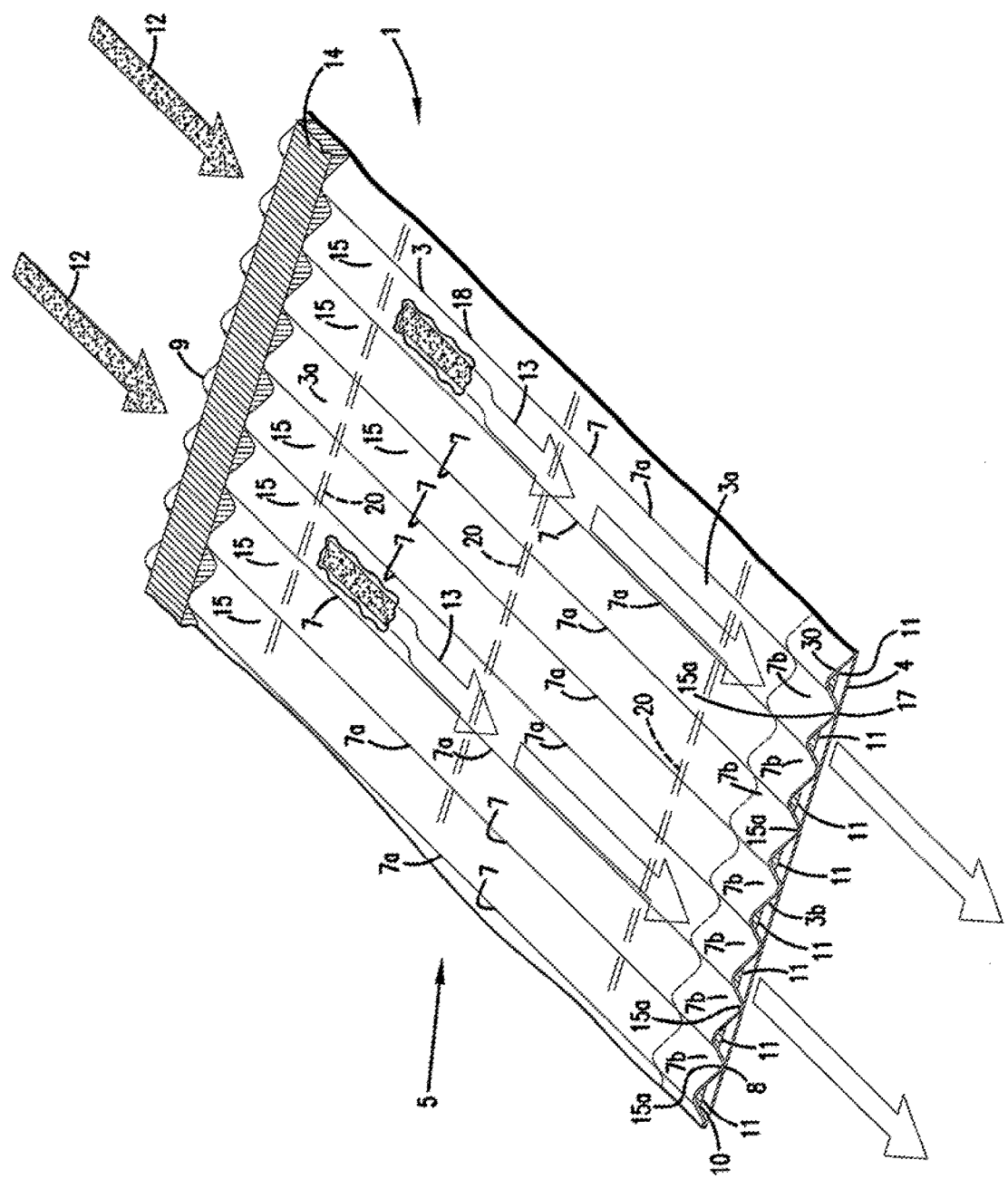
FIG. 1 is a fragmentary, schematic, perspective view of an example z-filtration media according to the prior art.

Methods and apparatuses for forming fluted filtration media, single facer media, and filtration media packs are provided. The fluted filtration media can be used alone or in combination with another filtration media such as, for example, a facing sheet, to form a single facer media. Furthermore, the fluted filtration media and the single facer media can each be used to form a filtration media pack. The fluted filtration media can be used to filter gaseous or liquid substances. An exemplary gaseous substance includes air, and exemplary liquid substances include water, oil, fuel, and hydraulic fluid. Forms of filtration media that can be provided by the methods and apparatuses of the invention include those disclosed in U.S. Patent Application Ser. Nos. 60/899,311 filed on Feb. 2, 2007 and 60/937,162 filed on Jun. 26, 2007. Both applications are incorporated by reference herein in their entirety.

The fluted filtration media prepared according to the methods and apparatuses according to the invention can be considered an improvement over prior art fluted filtration media. The flute peaks are typically characterized by a sharp radius or a defined tip that reduces masking. As used herein, masking refers to the area of proximity between the media sheets where there is a lack of substantial pressure difference across the media. In general, masking is experienced at the location in the media where there is close proximity or contact to another media sheet. This close proximity can result in resistance to flow through the media at that location. As a result, masked media is not useful to the filtration performance of filtration media.

Accordingly, it is desirable to reduce masking so as to increase the amount of filtration media available for filtration. Reduction in masking increases the dust storage capacity of the filtration media pack, increases the throughput of fluids through the filtration media for a given pressure drop, and/or decreases the pressure drop of the filtration media pack for a given overall fluid flow rate.

Media made in accordance with the invention will often have a substantially constant radius at the tip of the flute peak, even when the flute tapers in cross sectional area along the flute length. Thus, flute geometries made in accordance with the present invention that allow for tapering of the flute, thereby changing the cross sectional area of the flute, will also desirably maintain the same radius along much or all of the flute length.

In certain embodiments the filtration media is constructed with flutes that have different shapes and different open volumes on the upstream and downstream sides of the media pack, a characteristic that can be accomplished by forming media with tapered flutes. Media having different open volumes on the upstream and downstream sides is referred to as media having volumetric asymmetry. In some embodiments volumetric asymmetry can promote contaminant material storage, flow and filtration. Volumetric asymmetry can be particularly helpful for improving performance in filter configurations that have shallow media packs.

The flutes formed in the media typically have a width (D1, as shown for example in FIG. 4a) greater than their height (J, as shown for example in FIG. 5a). This width to height aspect ratio can be characterized as (D1/J). The width to height aspect ratio D1/J will typically not vary along the length of the flute, except for incidental variations. In most implementations the width to height aspect ratio is at least about 2.0, generally a least 2.1, more typically at least 2.2, often at least 2.3, and optionally at least 3.0. In some implementations, the width height ratio is greater than 2.4. Generally suitable D1/J ratios will be less than 10, more typically less than 8, and often less than 6. Suitable D1/J ratios will be greater than 1, more often greater than 1.5, and usually greater than 2. Other suitable D1/J ratios include, in example implementations, greater than 4, greater than 6, or greater than 8. Thus, suitable ranges include, but are not limited to, D1/J ratios of 2 to 10, 4 to 8, and 5 to 7. However, in some implementations flutes with extremely low D1/J ratios can be used (although such flutes are generally more difficult to manufacture). For example, D1/J ratios of less than 1.0, less than 0.75, and less than 0.50 are possible (see, e.g. FIG. 4c). In some implementations, flutes containing very high or very low D1/J values have better performance than flutes containing D1/J near values of 1.15 to 2.0.

The three dimensional structure of flutes defines open volumes upstream and downstream of the media for flow of fluid, as well as space for contaminants (such as dust) to accumulate. In some embodiments the filtration media exhibits a media volume asymmetry such that an open volume on one side of the media is greater than an open volume on the other side of the media. These volumes can extend from an upstream face to downstream face of the media pack.

Media volume asymmetry, as used herein, generally measures the media volume ratio of the larger media volume bounded by the flute peaks to the smaller media volume. In some but not all implementations, the larger media volume corresponds to the upstream open media volume, and the smaller media volume corresponds to the downstream open media volume (during use the open volume may accumulate contaminants, such as dust). In some implementations media will demonstrate a media volume asymmetry of more than 1%, more than 3%, more than 5%, or more than 10%. Example media constructions demonstrate a media volume asymmetry of greater than 15%, greater than 20%, greater than 50%, greater than 75%, greater than 100%, greater than 150%, and greater than 200%. Suitable media volume asymmetry ranges includes, for example, 1% to 300%, 5% to 200%; 50% to 200%; 100% to 200%; and 100% to 150%.

In addition to media volume asymmetry, the media may have flutes that also demonstrate media cross-sectional area asymmetry, which is calculated based upon a cross-section of the media. It will be understood that cross-sectional area asymmetry will often lead to differences in media volume asymmetry, but this is not always the case because cross sectional areas can be varied along the length of the flute so as to have a cumulative effect that the total volume on each side of the media is equal. In the case of the present invention, the cross-sectional area asymmetry my change along the length of the flutes in a manner such that the flutes have a tapered cross sectional area.

The differences in cross sectional area are controlled by the geometry of the flute design. Often the presence, number, and shape of ridges along the flutes significantly impacts, and often determines, the amount of cross sectional area asymmetry. Flute geometry that results in differences in cross sectional area can significantly impact flow properties through the flutes. Changes in relative cross sectional area of flutes typically results in changes in the cross sectional area of the upstream and downstream portion of the media pack in that area. The present invention allows for customization of media volume asymmetry and cross-sectional area asymmetry to improve filter performance.

In some embodiments the media will have a cross-sectional area asymmetry such that one side of the media has cross sectional area at least 1 percent greater than the opposite side the same piece of media. Often the difference in cross-sectional area across the media will be more than 3%, more than 5%, or more than 10%. Example media constructions demonstrate a media cross sectional area asymmetry of greater than 15%, greater than 20%, greater than 50%, greater than 75%, greater than 100%, greater than 150%, and greater than 200%. Suitable media cross sectional area asymmetry ranges includes, for example, 1% to 300%, 5% to 200%; 50% to 200%; 100% to 200%; and 100% to 150%.

Fluted Filtration Media

Fluted filtration media can be used to provide a variety of fluid filter constructions. One well known manner is as a z-filter construction. The terms "z-filter construction" or "z-filter media" as used herein, is meant to refer to a filter element construction in which individual ones of corrugated, folded, pleated, or otherwise formed filter flutes are used to define longitudinal filter flutes for fluid flow through the media; the fluid flowing along the flutes between inlet and outlet flow ends (or flow faces) of the filter element. Some examples of z-filter media filter elements are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media utilizes two media components joined together to form the media construction. The two components are: (1) a fluted (for example, corrugated) media sheet; and, (2) a facing media sheet. The facing media sheet is typically non-corrugated, however it can be corrugated, for example perpendicularly to the flute direction as described in International Publication No. WO 2005/077487, published Aug. 25, 2005, incorporated herein by reference. Alternatively, the facing sheet can be a fluted (for example, corrugated) media sheet and the flutes or corrugations may be aligned with or at angles to the fluted media sheet. Although the facing media sheet can be fluted or corrugated, it can be provided in a form that is not fluted or corrugated. Such a form can include a flat sheet. When the facing media sheet is not fluted, it can be referred to as a non-fluted media sheet or as a non-fluted sheet.

The type of z-filter media that utilizes two media components joined together to form the media construction wherein the two components are a fluted media sheet and a facing media sheet can be referred to as a "single facer media" or as a "single faced media." In certain z-filter media arrangements, the single facer media (the fluted media sheet and the facing media sheet), together, can be used to define media having parallel inlet and outlet flutes. In other arrangements, the inlet and outlet flutes can be non-parallel, depending, for example, on the selection of the portion of the media element having tapered flutes.

In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference. In general, arrangements where the z-filter media is coiled can be referred to as coiled arrangements, and arrangements where the z-filter media is stacked can be referred to as stacked arrangements. Filter elements can be provided having coiled arrangements or stacked arrangements.

Typically, coiling of the fluted sheet/facing sheet combination (e.g., the single facer media) around itself, to create a coiled media pack, is conducted with the facing sheet directed outwardly. Some techniques for coiling are described in International Publication No. WO 2004/082795, published Sep. 30, 2004, incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example, formed by corrugating or folding or pleating) extending thereacross. Fluted media can be prepared by any technique that provides the desired flute shapes. While corrugating can be a useful technique for forming flutes having a particular size. When it is desirable to increase the height of the flutes (the height is the elevation between peaks), corrugating techniques might not be practical and it may be desirable to fold or pleat the media. In general, pleating of media can be provided as a result of folding the media. An exemplary technique for folding the media to provide pleats includes scoring and using pressure to create the fold.

Filter element or filter cartridge configurations utilizing z-filter media are sometimes referred to as "straight through flow configurations" or by variants thereof. In general, in this context what is meant is that the serviceable filter elements generally have an inlet flow end (or face) and an exit flow end (or face), with flow entering and exiting the filter cartridge in generally the same straight through direction. The term "straight through flow configuration" disregards, for this definition, air flow that passes out of the media pack through the outermost wrap of facing media. In some instances, each of the inlet flow end and outlet flow end can be generally flat or planar, with the two parallel to one another. However, variations from this, for example non-planar faces, are possible in some applications. Furthermore, the characterization of an inlet flow face and an outlet flow face is not a requirement that the inlet flow face and the outlet flow face are parallel. The inlet flow face and the outlet flow face can, if desired, be provided as parallel to each other. Alternatively, the inlet flow face and the outlet flow face can be provided at an angle relative to each other so that the faces are not parallel. In addition, non-planar faces can be considered non-parallel faces.

A straight through flow configuration is, for example, in contrast to cylindrical pleated filter cartridges of the type shown in U.S. Pat. No. 6,039,778, in which the flow generally makes a substantial turn as its passes through the serviceable cartridge. That is, in a U.S. Pat. No. 6,039,778 filter, the flow enters the cylindrical filter cartridge through a cylindrical side, and then turns to exit through an end face in a forward-flow system. In a reverse-flow system, the flow enters the serviceable cylindrical cartridge through an end face and then turns to exit through a side of the cylindrical filter cartridge. An example of such a reverse-flow system is shown in U.S. Pat. No. 5,613,992.

The filter element or filter cartridge can be referred to as a serviceable filter element or filter cartridge. The term "serviceable" in this context is meant to refer to a media containing filter cartridge that is periodically removed and replaced from a corresponding air cleaner. An air cleaner that includes a serviceable filter element or filter cartridge is constructed to provide for the removal and replacement of the filter element or filter cartridge. In general, the air cleaner can include a housing and an access cover wherein the access cover provides for the removal of a spent filter element and the insertion of a new or cleaned (reconditioned) filter element.

In general, it is desirable to provide an appropriate flute closure arrangement to inhibit unfiltered air that flows in one side (or face) of the media from flowing out the other side (or face) of the media as part of the filtered air stream leaving the media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example U.S. 2006/0091084 A1, published May 4, 2006 to Baldwin Filters, Inc. also comprising flutes extending between opposite flow faces, with a seal arrangement to prevent flow of unfiltered air through the media pack. In many z-filter constructions according to the invention, adhesive or sealant can be used to close the flutes and provide an appropriate seal arrangement to inhibit unfiltered air from flowing from one side of the media to the other side of the media. Plugs, folds of media, or a crushing of the media can be used as techniques to provide closure of flutes to inhibit the flow of unfiltered air from one side of the media (face) to the other side of the media (face).

Referring to FIG. 1, an exemplary type of media 1 useable as z-filter media is shown. Although the media 1 is representative of prior art media, many of the terms relied upon for describing the media 1 can also describe portions of the media according to the invention. The media 1 is formed from a fluted (in the example corrugated) sheet 3 and a facing sheet 4. In general, the fluted corrugated sheet 3 is of a type generally characterized herein as having a regular, curved, wave pattern of flutes or corrugations 7. The term "wave pattern" in this context, is meant to refer to a flute or corrugated pattern of alternating troughs 7b and hills 7a. The term "regular" in this context is meant to refer to the fact that the pairs of troughs and hills (7b, 7a) alternate with generally the same repeating corrugation (or flute) shape and size. (Also, typically in a regular configuration each trough 7b is substantially an inverse of each hill 7a.)

The term "regular" is thus meant to indicate that the corrugation (or flute) pattern comprises troughs and hills with each pair (comprising an adjacent trough and hill) repeating, without substantial modification in size and shape of the corrugations along at least most of the length of the flutes. The term "substantial" in this context, refers to a modification resulting from a change in the process or form used to create the corrugated or fluted sheet, as opposed to minor variations from the fact that the media sheet forming the fluted sheet 3 is flexible.

With respect to the characterization of a repeating pattern, it is not meant that in any given filter construction an equal number of hills and troughs is necessarily present. The media 1 could be terminated, for example, between a pair comprising a hill and a trough, or partially along a pair comprising a hill and a trough. (For example, in FIG. 1 the media 2 depicted in fragmentary has eight complete hills 7a and seven complete troughs 7b.) Also, the opposite flute ends (ends of the troughs and hills) may vary from one another. Such variations in ends are disregarded in these definitions, unless specifically stated. That is, variations in the ends of flutes are intended to be covered by the above definitions.

In the context of fluted filtration media, and in particular the exemplary media 1, the troughs 7b and hills 7a can be characterized as peaks. That is, the highest point of the hills 7a can be characterized as peaks and the lowest points of the troughs 7b can be characterized as peaks. The combination of the fluted sheet 3 and the facing sheet 4 can be referred to as the single facer media 5. The peaks formed at the troughs 7b can be referred to as internal peaks because they face toward the facing sheet 4 of the single facer media 5. The peaks formed at the hills 7a can be characterized as external peaks because they face away from the facing sheet 3 forming the single facer media 5. For the single facer media 5, the fluted sheet 3 includes repeating internal peaks at 7b that face toward the facing sheet 4, and repeating external peaks at hills 7a that face away from the facing sheet 4.

The term "regular" as used herein also characterizes a flute pattern that is not "tapered," In general, a regular flute pattern can also be referred to as a straight flute pattern, which is distinguishable from a tapered flute configuration. In contrast to the prior art facer media 5 of FIG. 1, the media of the present invention typically demonstrates a tapered flute configuration.

In general, a taper refers to a reduction or an increase in the size of the open area of the flute along a length of the flute. In general, filtration media that is tapered can exhibit a first set of flutes that decrease in size from a first end of the media to a second end of the media, and a second set of flutes that increase in size from the first end of the media to the second end of the media. Filtration media that is tapered can also exhibit a first set of flutes that decrease in size from a first end of the media to an intermediate point in the media and have a substantially constant size from the intermediate point in the media to the second end of the media. A second set of flutes can increase in size from the second end of the media to the intermediate point in the media and then have a substantially constant size from the intermediate point in the media to the first end of the media. In such configurations, the total pressure drop can be reduced across the filter, as the filter openings can be maximized both upstream and downstream of the filter.

In the context of Z-media, there are generally two types of "asymmetry." One type of asymmetry is referred to as area asymmetry, and another type of asymmetry is referred to as volume asymmetry. In general, area asymmetry refers to an asymmetry in flute cross-sectional area and can be exhibited by tapered flutes. For example, area asymmetry exists if a fluted area at one location along the length of a flute is different from the fluted area at another location along the length of the flute. Because tapered flutes exhibit a decrease in size from a first location (e.g., end) to a second location (e.g., opposite end) of the media pack or an increase in size from a first location (e.g., end) to a second location (e.g., opposite end) of the media pack, there is an area asymmetry. This asymmetry (e.g. area asymmetry) is a type of asymmetry resulting from tapering and, as a result, media having this type of asymmetry can be referred to as non-regular.

Another type of asymmetry can be referred to as volume asymmetry and will be explained in more detail. Volume asymmetry refers to a difference between a dirty side volume and a clean side volume within the filter media pack. A media pack exhibiting volume asymmetry can be characterized as regular if the wave pattern is regular, and can be characterized as non-regular if the wave pattern is non-regular.

Z-media can be provided where at least a portion of the flutes are closed to the passage of unfiltered air by a technique other than providing a plug of adhesive or sealant. For example, the ends of flutes can be folded or crushed to provide a closure. One technique for providing a regular and consistent fold pattern for closing flutes can be referred to as darting. Darted flutes or darting generally refers to the closure of a flute wherein the closure occurs by folding the flute to create a regular fold pattern to collapse the flutes toward the facing sheet to provide a closure rather than by crushing. Darting generally implies a systematic approach to closing the ends of flutes as a result of folding portions of the flute so that the flute closures are generally consistent and controlled. For example, U.S. Patent Publication No. US 2006 0163150 A1 discloses flutes having a darted configuration at the ends of the flutes. In particular, the closure can be provided as a result of indenting the flute tip and then folding the indented flute tips toward the facing sheet. The darted configuration can provide advantages including, for example, a reduction in the amount of sealant needed to provide a seal, an increased security in the effectiveness of the seal, and a desirable flow pattern over the darted end of the flutes. Z-media can include flutes having darted ends, and the entire disclosure of U.S. Patent Publication No. US 2006 0163150 A1 is incorporated herein by reference. It should be understood that the existence of darts or flute closures at the ends of flutes does not render the media non-regular. The definition of "non-regular" does not take into account whether or not there exists a flute closure. That is, whether or not a flute can be considered regular or non-regular depends on the flute away from the closure.

It can be desirable to provide peaks having a radius that is sufficiently sharp so that it is not considered "curved." The radius can be less than 0.25 mm, or less than 0.20 mm. In order to reduce masking, it can be desirable to provide the peak with a knife edge. The ability to provide a knife edge at the peak can be limited by the equipment used to form the media, the media itself, and the conditions under which the media is subjected. For example, it is desirable to not cut or tear the media. Accordingly, using a knife edge to create the peak can be undesirable if the knife edge causes a cut or tear in the media. Furthermore, the media can be too light or too heavy to provide a sufficiently non-curved peak without cutting or tearing. Furthermore, the humidity of the air during processing can be enhanced to help create a tighter radius when forming the peak without damaging the media.

An additional characteristic of the particular regular, curved, wave pattern depicted in FIG. 1, for the corrugated sheet 3, is that at approximately a midpoint 30 between each trough 7b and each adjacent hill 7a, along most of the length of the flutes 7, is located a transition region where the curvature inverts. For example, viewing back side or face 3a, FIG. 1, trough 7b is a concave region, and hill 7a is a convex region. Of course when viewed toward front side or face 3b, trough 7b of side 3a forms a hill; and, hill 7a of face 3a, forms a trough. In some instances, region 30 can be a straight segment, instead of a point, with curvature inverting at ends of the segment 30. When the region 30 is provided as a straight segment, the wave pattern depicted in FIG. 1, for example, can be characterized as an "arc-straight-arc" wave pattern because of the repeating pattern of curve at the hill 7a, straight segment at the region 30, and curve at the trough 7b.

Referring to FIG. 1 and as referenced above, the media 2 has first and second opposite edges 8 and 9. For the example shown, when the media 2 is coiled and formed into a media pack, in general edge 9 will form an inlet end for the media pack and edge 8 an outlet end, although an opposite orientation is possible in some applications.

In the example shown, adjacent edge 8 is provided sealant, in this instance in the form of a sealant bead 10, sealing the fluted sheet 3 and the facing sheet 4 together. Bead 10 will sometimes be referred to as a "single facer" bead, since it is a bead between the corrugated sheet 3 and the facing sheet 4, which forms the single facer media 5. Sealant bead 10 seals closed individual flutes 11 adjacent edge 8, to passage of air therefrom.

In the example shown, at adjacent edge 9 is provided sealant, in this instance in the form of a sealant bead 14. Sealant bead 14 generally closes flutes 15 to passage of unfiltered fluid therethrough, adjacent edge 9. Bead 14 would typically be applied as the media 2 is coiled about itself, with the corrugated sheet 3 directed to the inside. Thus, bead 14 will form a seal between a back side 17 of facing sheet 4, and side 18 of the fluted sheet 3. The bead 14 will sometimes be referred to as a "winding bead" since it is typically applied, as the strip 2 is coiled into a coiled media pack. If the media 2 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, a z-filter media pack can be characterized as comprising fluted filter media secured to facing filter media, and configured in a media pack of flutes extending between first and second flow faces. A sealant or seal arrangement is provided within the media pack, to ensure that air entering flutes at a first upstream flow face or edge cannot exit the media pack from a downstream flow face or edge, without filtering passage through the media. Alternately stated, a z-filter media pack is closed to passage of unfiltered air therethrough, between the inlet flow face and the outlet flow face, typically by a sealant arrangement or other arrangement. An additional alternative characterization of this is that a first portion of the flutes are closed or sealed to prevent unfiltered air from flowing into the first portion of flutes, and a second portion of the flutes are closed or sealed to prevent unfiltered air from flowing out of the media pack, so that air passing into one of the flow faces and out the other flow face passes through media to provide filtration of the air.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved," and "wave pattern."

In general, the filter media is a relatively flexible material, typically a non-woven fibrous material (of cellulose fibers, synthetic fibers or both) often including a resin therein, sometimes treated with additional materials. Thus, it can be conformed or configured into the various fluted, for example corrugated, patterns, without unacceptable media damage. Also, it can be readily coiled or otherwise configured for use, again without unacceptable media damage. Of course, it must be of a nature such that it will maintain the required fluted (for example corrugated) configuration, during use.

In the corrugation or fluting process, an inelastic deformation is caused to the media. This prevents the media from returning to its original shape. However, once the tension is released the flutes or corrugations will tend to spring back, recovering only a portion of the stretch and bending that has occurred. The facing sheet is sometimes tacked to the fluted sheet, to inhibit this spring back in the fluted (or corrugated) sheet.

Also, the media can contain a resin. During the corrugation process, the media can be heated to above the glass transition point of the resin. When the resin cools, it will help to maintain the fluted shapes.

The media of the fluted sheet 3, facing sheet 4 or both, can be provided with a fine fiber material on one or both sides thereof, for example in accord with U.S. Pat. Nos. 6,955,775, 6,673,136, and 7,270,693, incorporated herein by reference.

In general, fine fiber can be referred to as polymer fine fiber (microfiber and nanofiber) and can be provided on the media to improve filtration performance. As a result of the presence of fine fiber on the media, it may be possible or desirable to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Nanofiber refers to a fiber having a diameter of less than 200 nanometer or 0.2 micron. Microfiber can refer to fiber having a diameter larger than 0.2 micron, but not larger than 10 microns. Exemplary materials that can be used to form the fine fibers include polyvinylidene chloride, polyvinyl alcohol polymers and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Still referring to FIG. 1, at 20 tack beads are shown positioned between the fluted sheet 3 and facing sheet 4, securing the two together. The tack beads 20 can be for example, discontinuous lines of adhesive. The tack beads can also be points in which the media sheets are welded together.

From the above, it will be apparent that the exemplary fluted sheet 3 depicted is typically not secured continuously to the facing sheet, along the peaks where the two adjoin. Thus, air can flow between adjacent inlet flutes, and alternately between the adjacent outlet flutes, without passage through the media. However, unfiltered air which has entered a flute through the inlet flow face cannot exit from a flute through the outlet flow face without passing through at least one sheet of media, with filtering.

Figure 2:
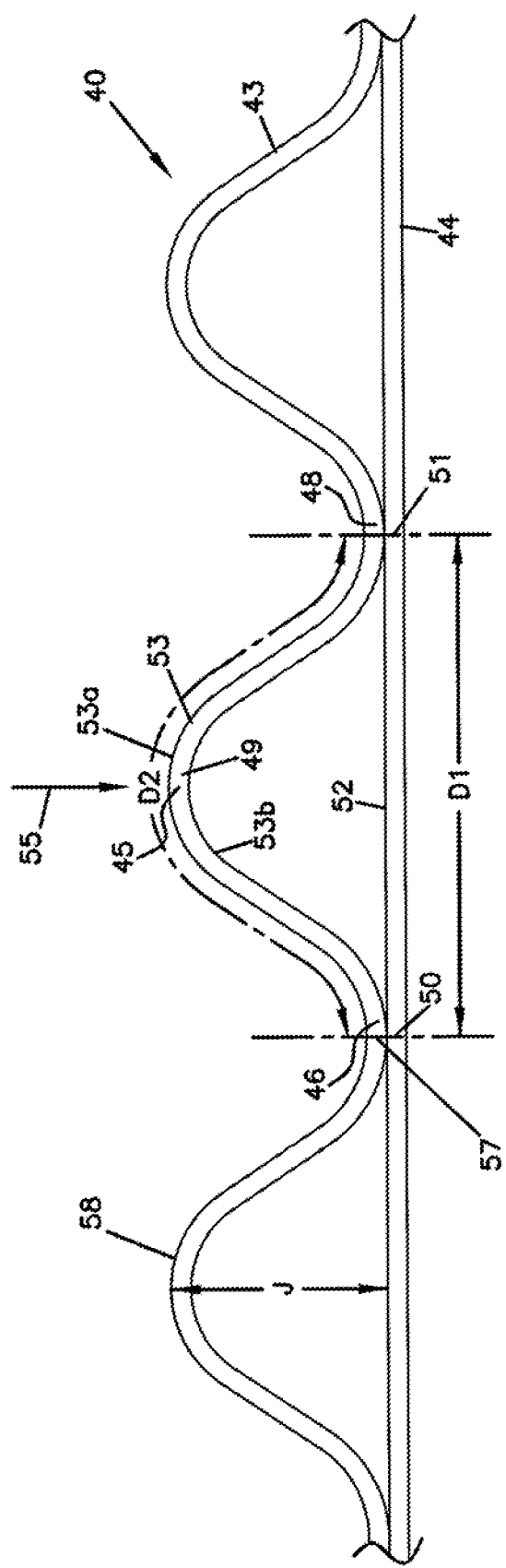
FIG. 2 is an enlarged schematic, cross-sectional view of a portion of the prior art media depicted in FIG. 1.

Attention is now directed to FIG. 2, in which a z-filter media construction 40 utilizing a fluted (in this instance regular, curved, wave pattern) sheet 43, and a non-corrugated flat, facing sheet 44, is depicted. The distance D1, between points 50 and 51, defines the extension of flat media 44 in region 52 underneath a given flute 53. The points 50 and 51 are provided as the center point of the internal peaks 46 and 48 of the fluted sheet 43. In addition, the point 45 can be characterized as the center point of the external peak 49 of the fluted sheet 43. The distance D1 defines the period length or interval of the media construction 40. The length D2 defines the arcuate media length for the flute 53, over the same distance D1, and is of course larger than D1 due to the shape of the flute 53.

The flute height J is the distance from the facing sheet 44 to the highest point of the fluted sheet 43. Alternatively stated, the flute height J is the difference in exterior elevation between adjacent peaks 57 and 58 of the fluted sheet 43. The flute height J takes into account the thickness of the fluted sheet 43. The peak 57 can be referred to as the internal peak, and the peak 58 can be referred to as the external peak. Although the distances D1, D2, and J are applied to the specific fluted media arrangement shown in FIG. 2, these distances can be applied to other configurations of fluted media where D1 refers to the period length of a flute or the distance of flat media underneath a given flute, D2 refers to the length of fluted media from lower peak to lower peak, and J refers to the flute height.

Another measurement can be referred to as the cord length (CL). The cord length refers to the straight line distance from the center point 50 of the lower peak 57 and the center point 45 of the upper peak 58. The cord length (CL) can additionally be expresses as the straight line distance between the center points of adjacent peaks. It should be understood that the thickness of the media and the decision where to begin or end a particular distance measurement can affect the distance value because the media thickness affects the distance value. For example, the cord length (CL) can have different values depending upon whether the distance is measured from the bottom of the internal peak to the bottom of the external peak or whether it is measured from the bottom of the internal peak to the top of the external peak. This difference in distance is an example of how the media thickness can effect the distance measurement. In order to minimize the effect of the thickness of the media, the measurement for cord length is determined from a center point within the media.

The relationship between the cord length CL and the media length D2 can be characterized as a media-cord percentage. The media-cord percentage can be determined according to the following formula:

$$\text{media-cord percentage} = \frac{\left(\frac{1}{2}D2 - CL\right) \times 100}{CL}$$

In the corrugated cardboard industry, various standard flutes have been defined. These include, for example, the standard E flute, standard X flute, standard B flute, standard C flute, and standard A flute. FIG. 3, in combination with Table 1 below provides definitions of these flutes.

Donaldson Company, Inc., (DCI) the assignee of the present disclosure, has used variations of the standard A and standard B flutes, in a variety of z-filter arrangements. The DCI standard B flute can have a media-cord percentage of about 3.6%. The DCI standard A flute can have a media-cord percentage of about 6.3. FIG. 2 shows a z-filter media construction 40 utilizing the standard B flute as the fluted sheet 43.

TABLE 1

(Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

In general, standard flute configurations from the corrugated box industry have been used to define corrugation shapes or approximate corrugation shapes for corrugated media. Improved performance of filtration media can be achieved by providing a flute configuration or structure that enhances filtration. In the corrugated box board industry, the size of the flutes or the geometry of the corrugation was selected to provide a structure suited for handling a load. The flute geometry in the corrugated box industry developed the standard A flute or B flute configuration. While such flute configurations may be desirable for handling a load, filtration performance can be enhanced by altering the flute geometry. Techniques for improving filtration performance include selecting geometries and configurations that improve filtration performance in general, and that improve filtration performance under selected filtration conditions. Exemplary flute geometries and configurations that can be altered to improve filtration performance include flute masking, flute shape, flute width height ratio, and flute asymmetry. In view of the wide selection of flute geometries and configurations, the filter element can be configured with desired filter element geometries and configurations in view of the various flute geometries and configurations to improve filtration performance.

Filtration performance can be enhanced by increasing the amount of filtration media available for filtration. Techniques for increasing the amount of filtration media available for filtration include reducing masking, adjusting flute width height ratio, increasing flute density, adjusting flute shape, and reducing plug length. These techniques for increasing the amount of filtration of media available for filtration can be used individually or combined, as desired. Each of these techniques is described in more detail.

Reducing masking can be considered a technique for increasing the surface area of media available for filtration. In the context of z-media, masking refers to the area of proximity between the fluted sheet and the facing sheet where there is a lack of substantial pressure difference resulting in a lack of useful filtration media at that location when the filtration media is in use. In general, masking is often characterized by the location in the media where there is proximity to another media sheet so that there is a resistance to flow through the media at that location. As a result, masked media is not useful for significantly enhancing the filtration performance of filtration media. Accordingly, it is desirable to reduce masking to thereby increase the amount of filtration media available for filtration and thereby increase the capacity of the filtration media, increase the throughput of the filtration media, decrease the pressure drop of the filtration media, or some or all of these.

In the case of a fluted sheet arranged in a pattern with broad radii at the peaks as shown in FIG. 2, there exists a relatively large area of filtration media proximate the contact area of the fluted sheet and the facing sheet that is generally not available for filtration. Masking can be reduced by decreasing the radii of contact between the fluted sheet and the facing sheet (providing sharper contact points). Masking generally takes into account the deflection of the media when it is under pressure (e.g., during air filtration). A relatively larger radius may result in more of the fluted media being deflected toward the facing sheet and thereby increasing masking. By providing a sharper contact point (e.g., a peak having a smaller radius), masking can be reduced.

Attempts have been made to reduce the radii of contact between a fluted sheet and a facing sheet. For example, see U.S. Pat. No. 6,953,124 to Winter et al. A curved wave pattern such as the curved wave pattern shown in FIG. 1 generally provides a fluted sheet having a radius at the peaks of at least 0.25 mm and typically not more than 3 mm. A relatively sharp contact point can be characterized as a contact point at the peak having a radius of less than 0.25 mm. A relatively sharp contact point can be provided having a radius of less than about 0.20 mm. In addition, masking can be reduced by providing a peak having a radius of less than about 0.15 mm, and preferably less than about 0.10 mm. The peak can be provided having no radius or essentially a radius of about 0 mm. Exemplary techniques for providing fluted media exhibiting relatively sharp contact points at the peaks includes coining, bending, folding, or creasing the fluted media in a manner sufficient to provide a relatively sharp edge. It should be understood that the ability to provide a sharp edge depends on a number of factors including the composition of the media itself and the processing equipment used for providing the bend, fold, or crease. In general, the ability to provide a relatively sharp contact point depends on the weight of the media and whether the media contains fibers that resist tearing or cutting. In general, it is desirable to not cut the filtration media during coining, bending, folding, or creasing.

While it is desirable to reduce the radius of the peaks (internal peak or external peak) to reduce masking, it is not necessary that all of the peaks have a reduced radius to decrease masking. Depending on the design of the media, it may be sufficient to provide the external peaks with a reduced radius or to provide the internal peaks with a reduced radius, or to provide both the external peaks and the internal peaks with a reduced radius in order to decrease masking.

Another technique for increasing the surface area of media available for filtration includes introducing more media into a volume of space available for filtration. For example, the amount of filtration media available for filtration can be increased by adjusting the flute width height ratio. An example of media having flutes forming an equilateral triangle is shown in FIG. 2 of U.S. Pat. No. 6,953,124. While the theoretical equilateral triangular flute shape may be desirable in the corrugated boxboard industry for handling a load, filtration performance can be enhanced by selecting a flute shape that is different from the theoretical equilateral triangle. One possible explanation for this phenomena is that the theoretical equilateral triangular shape provides the least amount of media available for filtration compared with other flute designs where the period length or interval D1 is increased or decreased, or the flute height J is increased or decreased, relative to the other. Furthermore, it should be appreciated that because the media is flexible, the media may deflect when subjected to pressure such as during filtration. As a result, the media deflection may increase masking, and it is expected that this type of masking may provide a more pronounced effect in the case of a theoretical equilateral triangular shaped flute.

One technique for increasing the surface area of media available for filtration is by selecting the flute width height ratio. The flute width height ratio is the ratio of the flute period length D1 to the flute height J. The flute width height ratio can be expressed by the following formula:

$$\text{ratio} = \text{flute width height} \frac{1^D}{J}$$

Measured distances such as flute period length D1 and the flute height J can be characterized as average values for the filtration media along the flute length excluding 20% of the flute length at each end. The distances D1 and J can be measured away from the ends of the flutes because the ends of the flutes are typically deformed as a result of the presence of sealant or closure technique. The flute width height ratio calculated at a flute closure would not necessarily represent the flute width height ratio of the flute where the filtration is taking place. Accordingly, the measure of flute width height ratio can be provided as an average value over the flute length with the exception of the last 20% of the flute length near the ends of the flutes to remove the effects of flute closure when the flutes are closed at or near the ends. For "regular" media, it is expected that the flute period length D1 and the flute height J will be relatively constant along the flute length. By relatively constant, it is meant that the flute width height ratio can vary within about 10% over the length of the flute excluding the 20% length at each end where flute closure designs may effect the width height ratio. In addition, in the case of a "non-regular" media, such as, media having tapered flutes, the flute width height ratio can vary or remain about the same over the length of the flute. By adjusting the flute shape away from a theoretical equilateral triangle shape, the amount of media in a given volume available for filtration can be increased. Accordingly, flutes having a flute width height ratio of at least about 2.2, at least about 2.5, at least about 2.7, or at least about 3.0 can provide an increased surface area of media available for filtration. In addition, providing a flute design having a width height ratio of less than about 0.45, less than about 0.40, less than about 0.37, or less than about 0.33 can provide increased media area available for filtration. In general, a theoretical flute having a equilateral triangle shape represents a flute width height ratio of about 1.6.

Another technique for increasing the amount of filtration media available for filtration includes increasing the flute density of the media pack. The flute density refers to the number of flutes per cross-sectional area of filtration media in a filtration media pack. The flute density depends on a number of factors including the flute height J, the flute period D1, and the media thickness T. The flute density can be characterized as a media pack flute density or as a single facer media flute density. The equation for calculating the media pack flute density (ρ) for a filter element is:

$$\rho = \frac{\text{number of channels (open and closed)}}{2 \times z\text{-media pack cross sectional area}}$$

The flute density of a filter element can be calculated by counting the number of channels including those channels that are open and those channels that are closed in a cross sectional area of the filter element, and dividing that by two times the cross sectional area of the filter element at the location where the number of channels was determined. In general, it is expected that the flute density will remain relatively constant across the length of the filter element from the inlet flow face to the outlet flow face, or vice versa. It should be understood that the z-media cross sectional are refers to the cross sectional area of the media (wound or stacked) and not necessarily to the cross sectional area of the filter element. The filter element may have a sheath or a seal intended to engage a housing that would provide the filter element with a cross-sectional area that is greater than the cross-sectional area of the media. Furthermore, the cross-sectional area of the media refers to the effective area. That is, if the media is wound around a core or mandrel, the cross-sectional area of the core or mandrel is not part of the z-media pack cross sectional area.

An alternative equation for the calculation of flute density (ρ) for a single facer media is:

$$\rho = \frac{1}{(J+T) \times D1}$$

In the equation for flute density, J is the flute height, D1 is the flute period length, and T is the thickness of the fluted sheet. This alternate equation can be referred to as the equation for calculating the single facer media flute density. The single facer media flute density is determined based upon the configuration of the single facer media. In contrast, the media pack flute density is determined based upon the assembled media pack Theoretically, the media pack flute density and the single facer media flute density should provide similar results. However, it is possible that the media pack may be configured in such a way that the media pack flute density and the single facer media flute density provide different results.

The standard B flute shown in FIGS. 2 and 3 and characterized in Table 1 provides a coiled filtration media having a flute density (media pack flute density and single facer media flute density) of about 34 flute/inch$^2$. The media pack formed from standard B flute media can be characterized as having an average flute density of about 34 flute/inch$^2$. The flute density (whether expressed as the media pack flute density or the single facer media flute density) can be considered an average flute density for the media pack unless stated otherwise. The flute density, therefore, may be referred to at times as the flute density and at other times as the average flute density. In general, increasing the average flute density refers to providing a media pack having a flute density greater than the flute density for standard B flute media. For example, increased flute density can refer to a media pack having a flute density greater than 35.0 flute/inch$^2$. The media pack can be provided having a flute density of greater than about 36 flute/inch$^2$, greater than about 38 flute/inch$^2$, greater than about 40 flute/inch$^2$, greater than 45 flute/inch$^2$, or greater than about 50 flute/inch$^2$. The media pack can be provided having a decreased flute density (compared with standard B media) to provide decreased pressure drop or less resistance to flow therethrough. For example, the media pack can be provided having a media pack flute density of less than about 34 flute/inch$^2$, less than 30 flute/inch$^2$, or less than about 25 flute/inch$^2$.

In general, providing media having increased flute density has a tendency to increase the surface area of media within a volume of the media and, therefore, has a tendency to increase the loading capacity of the filtration media. Accordingly, increasing the flute density of media can have the effect of enhancing the loading capacity of the media. However, increasing the flute density of media can have the effect of increasing the pressure drop through the media assuming other factors remain constant.

Increasing the flute density of filtration media can have the effect of decreasing the flute height (J) or the flute period length (D1), or both. As a result, the size of the flute (the size of the flute refers to cross sectional area of the flute) tends to decrease as flute density increases. Smaller flute sizes often, but not always, have the effect of increasing the pressure drop across the filtration media. In general, the reference to a pressure drop across the media refers to the pressure differential determined at a first face of the media relative to the pressure measured at second face of the media, wherein the first face and the second face are provided at generally opposite ends of a flute. In order to provide a filtration media having a relatively high flute density while retaining a desired pressure drop, the flute length can be decreased.

The flute length refers to the distance from the first face of the filtration media to the second face of the filtration media. In the case of filtration media useful for filtering air for combustion engines, short length flutes can be characterized as those flutes having a flute length of less than about 5 inches (e.g., about 1 inch to about 5 inches, or about 2 inches to about 4 inches). Medium length flutes can be characterized as those flutes having a length of about 5 inches to about 8 inches. Long length flutes can be characterized as those flutes having a flute length of greater than about 8 inches (e.g., about 8 inches to about 12 inches).

Another technique for increasing the amount of filtration media available for filtration within a media pack includes selecting a fluted media configuration that provides for an increased amount of filtration media available for filtration compared with standard fluted media designs such as those described in Table 1. One technique for providing a fluted media design that increases the amount of filtration media available for a filtration is by creating a ridge between adjacent peaks. As discussed previously, fluted media peaks can be characterized as an internal peak or external peak depending upon whether the peak is facing toward the facing sheet or away from the facing sheet in the case where the fluted media is adhered to a facing sheet to form a single facer media. In the case where there is no facing sheet, the internal peak and the external peak can be selected depending on a desired orientation. It should be kept in mind, however, that internal peaks are on one side of the fluted filtration media, and external peaks are provided on the other side of the fluted filtration media.

FIGS. 4a-c show portions of media having exemplary flute shapes for enhancing filtration performance. With regard to FIG. 4a, the media 110 includes a fluted sheet 112 between facing sheets 111 and 113; with regard to FIG. 4b the media 120 includes fluted sheet 122 between facing sheets 121 and 123; and with regard to FIG. 4c the media 140 includes fluted sheet 142 between facing sheets 141 and 143. The combination of the fluted sheet 112 and the facing sheet 113 can be referred to as a single facer media 117, the combination of the fluted sheet 122 and the facing sheet 123 can be referred to as a single facer media 137, and the combination of the fluted sheet 142 and the facing sheet 143 can be referred to as the single facer media 147. When the single facer media 117, 137, or 147 is coiled or stacked, the facing sheet 111, 121, or 141 can be provided from another single facer media in the case of stacked media or from the same single facer media in the case of coiled media.

The media 110, 120, and 140 of FIGS. 4a-c can be arranged to provide filter elements for cleaning a fluid such as air. The filter elements can be arranged as coiled elements or stacked elements. Coiled elements generally include a fluted media sheet and a facing media sheet that is wound to provide the coiled construction. The coiled construction can be provided having a shape that is characterized as round, obround, or racetrack. A stacked construction generally includes alternating layers of media comprising fluted media sheet adhered to facing media sheet. In general, a fluted media sheet adhered to facing media sheet can be referred to as a single facer media. The media 110 shown in FIG. 4a is a sectional view taken across the media to show the cross-sectional shape of the fluted sheet for the low contact and low strain shapes. It should be understood that the cross-sectional shape can be provided extending along a length of the flute. Furthermore, the flutes can be sealed so that the media functions as z-media. The seal can be provided, if desired, as an adhesive or sealant material.

In FIG. 4a, the distance D1 is measured from the center point of the internal peak 114 to the center point of the internal peak 116. Alternatively, the distance D1 can be measured from the center point of the external peak 115 to the center point of the external peak 119. The fluted media 110 is shown having two ridges 118 for each period length D1, or along the media length D2. The ridges 118 are provided extending along at least a portion of the length of the flute. In general, each ridge 118 can be characterized as a general area where a relatively flatter portion of the fluted media 118a joins a relatively steeper portion of the fluted media 118b. A ridge (e.g., a non-peak ridge) can be considered a line of intersection between different sloped media portions. A ridge can be formed as a result of deformation of the media at that location. The media can be deformed at the ridge as a result of applying pressure to the media. The technique of applying pressure to the media can be referred to as coining.

For the exemplary fluted sheet 112, the relatively flatter portion of the fluted media 118a can be seen in FIG. 4a as the portion of the fluted media extending between the external peak 115 and the ridge 118. The angle of this relatively flatter portion may vary in different implementations such that it is, for example at an angle between 0 and 90° to the flat sheet. The average angle of the relatively flatter portion of the fluted media 118a from the external peak 115 to the ridge 118 can be characterized as less than 45°, and can be provided as less than about 30° relative to the facing sheet 113. The relatively steeper portion of the fluted media 118b can be characterized as that portion of the media extending from the internal peak 116 to the ridge 118. In general, the angle of the relatively steeper portion of the fluted media 118b, as characterized as extending between the internal peak 116 and the ridge 118 can be greater than 45° and can be greater than about 60° relative to the facing sheet 113. It is the difference in angle between the relatively flatter portion of the fluted media 118a and the relatively steeper portion of the fluted media 118b that provides for the presence of the ridge 118. It should be understood that the angle of the relatively flatter portion of the fluted media 118a and the angle of the relatively steeper portion of the fluted media 118b can be determined as the angle between the points that form the end points of the section of the media (e.g. fluted media 118a or fluted media 118b), and the angle is measured from the facing sheet 113. Furthermore, the reference to specific angles is for illustration, and the portions of the media forming the ridge 118 can have angles different than those identified above.

The ridge 118 can be provided as a result of coining, creasing, bending, or folding along a length of the fluted sheet 112 during the formation of the fluted media 12. It may be desirable, but it is not necessary, during the step of forming the fluted media 112 to take the steps to set the ridge 118. For example, the ridge 118 can be set by heat treatment or moisture treatment or a combination thereof. In addition, the ridge 118 can exist as a result of creasing, bending, or folding to form the ridge without an additional step of setting the ridge. Furthermore, the characterization of a ridge 118 is not to be confused with the fluted sheet external peaks 115 or 119 and the fluted sheet internal peaks 116 or 114. The characterization of a generally flatter portion 118a and a generally steeper portion 118b is intended as a way to characterize the presence of a ridge. In general, it is expected that the flatter portion 118a and the steeper portion 118b will exhibit a curve. That is, it is expected that the flatter portion 118a and the steeper portion 118b will not be completely planar, particularly as fluids such as air flows through the media during filtration. Nevertheless, the angle of the media relative to the facing sheet can be measured for portions of the media to determine the presence of a ridge 118.

The shape of the media depicted in FIG. 4a can be referred to as a low contact shape. In general, the low contact shape refers to the relatively low area of contact between the fluted sheet 112 and the facing sheet 111. The presence of the ridge 118 helps provide for reduced masking at the peaks 115 and 119. The ridge 118 exists as a result of the forming of fluted sheet 112 and, as a result, reduces the internal stress on the media at the peaks 115 and 119. Without the presence of the ridge 118, there would likely exist a level of internal tension in the fluted sheet 112 that would cause the fluted sheet 112 to create a greater radius at the peaks 115 and 119, and thereby increase masking. As a result, the presence of the ridge 118 helps increase the amount of media present between adjacent peaks (e.g., peaks 115 and 114) and helps decrease the radius of the peak (e.g., peak 115) as a result of relieving, to a certain extend, the tension within the fluted sheet 112 that would cause it to expand or flatten out at the peaks in the absence of the ridge.

The presence of a ridge 118 can be detected by visual observation. While the presence of the low contact shape may not be particularly apparent from viewing the end of the fluted media, one can cut into the filter element and see the presence of a ridge extending along a length of a flute. Furthermore, the presence of a ridge can be confirmed by a technique where the filter element is loaded with dust, and the fluted sheet can be peeled away from the facing sheet to reveal a cake of dust having a ridge corresponding to the ridge on the fluted media. In general, the ridge on a cake of dust reflects a portion of the dust surface having an average angle intersecting another portion of the dust surface having a different average angle. The intersection of the two portions of the dust surface cake forms a ridge. The dust that can be used to load the media to fill the flutes to provide a cake of dust within the flutes can be characterized as ISO Fine test dust.

Now referring further to FIG. 4a, the fluted sheet 112 includes two ridges 118 over the distance D2 where the distance D2 refers to the length of the fluted sheet 112 from the center point of the peak 114 to the center point of the peak 116, and wherein the ridges are not the peaks 114, 115, 116, or 119. Although the peaks 114 and 116 can be referred to as internal peaks, they can also be referred to as adjacent first side peaks (or adjacent second side peaks). Although the peaks 115 and 119 can be referred to as external peak, they can also be referred to as adjacent second side peaks (or adjacent first side peaks as long as the selection of first or second is opposite to the selection made for the peaks 114 and 116). The peaks can additionally be characterized as facing sheet peaks in the case where the peaks face toward a facing sheet. In the case where there is no facing sheet, the peaks can simply be referred to as the peaks, as same side peaks, as adjacent first side peaks, or as the adjacent second side peaks. In general, the reference to "adjacent same side peaks" refers to peaks that can be used to define a period. The reference to "adjacent peaks" without the characterization of "same side" refers to peaks next to each other but facing in different directions (e.g., peaks 114 and 115). This characterization of the peaks is convenient for describing fluted media such as the media shown in the figures.

Although the fluted sheet 112 can be provided having two ridges 118 along each length D2, the fluted sheet 112 can be provided having a single ridge along each period length D2, if desired, and can be provided having a configuration where some of the periods exhibit at least one ridge, some periods exhibit two ridges, and some periods exhibit no ridge, or any combination thereof.

The fluted sheet can be characterized as having a repeating pattern of flutes when made by a process that repeats the flute pattern. A repeating pattern of flutes means that across the length of the media (e.g., in the machine direction), the pattern of flutes repeats. For example, every flute may exhibit a ridge between adjacent peaks. There may be a pattern where every flute may exhibit two ridges between adjacent peaks. Furthermore, there may be a pattern where a ridge is present between adjacent peaks of some flutes but not between adjacent peaks of other flutes. For example, a period may exhibit a single ridge or two ridges, and a subsequent period may exhibit no ridge, a single, or two ridges, and a subsequent flute may exhibit no ridge, one ridge, or two ridge, etc. At some point, the pattern repeats itself. There is no requirement, however, that a ridge or two ridges are present between every adjacent peak. Benefits of the invention can be obtained by providing a repeating pattern of flutes, wherein within that repeating pattern, at least one ridge is present between adjacent peaks. Preferably, the pattern includes two ridges between adjacent same side peaks as shown in FIG. 4a.

The characterization of the presence of a ridge should be understood to mean that the ridge is present along a length of the flute. In general, the ridge can be provided along the flute for a length sufficient to provide the resulting media with the desired performance. While the ridge may extend the entire length of the flute, it is possible that the ridge will not extend the entire length of the flute as a result of, for example, influences at the ends of the flute. Exemplary influences include flute closure (e.g., darting) and the presence of plugs at the ends of flutes. Preferably, the ridge extends at least 20% of the flute length. By way of example, the ridge can extend at least 30% of the flute length, at least 40% of the flute length, at least 50% of the flute length, at least 60% of the flute length, or at least 80% of the flute length. The ends of the flutes may be closed in some manner and that as a result of the closure, one may or may not be able to detect the presence of a ridge when viewing the media pack from a face. Accordingly, the characterization of the presence of a ridge as extending along a length of the flute does not mean that the ridge must extend along the entire length of the flute. Furthermore, the ridge may not be detected at the ends of the flute.

The flutes of fluted sheet 112 of FIG. 4a can be designed to taper from one point along the media to a second point. It is desirable, in general, to have this taper substantially preserve the radius of at the peaks 115 and 119 of the flute.

Now referring to FIG. 4b, the fluted media 120 includes a fluted sheet 122 provided between facing sheets 121 and 123. The fluted sheet 122 includes at least 2 ridges 128 and 129 between adjacent peaks 124 and 125. Along the length D2, the media 122 includes 4 ridges 128 and 129. A single period length of the media can include four ridges. It should be understood that the ridges 128 and 129 are not the peaks 124, 125, or 126 that can be referred to as the facing media peaks. The media 122 can be provided so that between adjacent peaks (e.g., peaks 125 and 126) there are two ridges 128 and 129. Again, a repeating pattern can be provided. In the repeating pattern shown in FIG. 4b, there are two ridges between each adjacent peak, and there are four ridges provided in each period. In an alternative repeating pattern, there may be any number (e.g., 0, 1 or 2) ridges between adjacent peaks as long as the repeating pattern includes the occurrence of at least one ridge between adjacent peaks somewhere in the pattern. In a preferred embodiment shown in FIG. 4b, there are two ridges between each adjacent peak.

The ridge 128 can be characterized as the area where a relatively flatter portion of the fluted media 128a joins a relatively steeper portion of the fluted media 128b. In general, the relatively flatter portion of the fluted media 128a can be characterized as having an angle of less than 45° and preferably less than about 30° wherein the angle is measured between the ridge 128 and the ridge 129. The relatively steeper portion of the fluted media 128b can be characterized as having an angle of greater than 45° and preferably greater than about 60° wherein the angle is measured from the peak 126 to the ridge 128. The ridge 129 can be provided as a result of the intersection of the relatively flatter portion of the fluted media 129a and the relatively steeper portion of the fluted media 129b. In general, the relatively flatter portion of the fluted media 129a corresponds to the angle of the portion of the media extending from the ridge 128 to the ridge 129. In general, the relatively flatter portion of the fluted media 129a can be characterized as having a slope of less than 45°, and preferably less than about 30°. The relatively steeper portion of the fluted media 129b can be characterized as that portion of the fluted media extending between the ridge 129 and the peak 125 and can be characterized as having an angle between the ridge 129 and the peak 125. In general, the relatively steeper portion of the fluted media 129b can be characterized as having an angle of greater than 45° and preferably greater than about 60°.

The flutes of fluted sheet 122 of FIG. 4b can be designed to taper from one point along the media to a second point. It is desirable, in general, to have this taper substantially preserve the radius of at the peak 125 of the flute. This radius can be preserved, for example, by having relatively flatter portions of the fluted media 128a and 129a effectively move up and down as the media tapers, while having the relatively steep portions 128b become longer and shorter so as to create a tapered flute. Such shortening of the steep portions 128b can change the cross sectional area of the flute, while preserving the flute width D1 and preserving the sharp peak 125.

Now referring to FIG. 4c, the fluted media 140 includes a fluted sheet 142 provided between facing sheets 141 and 143. The fluted sheet 142 includes at least two ridges 148 and 149 between the internal peak 144 and the external peak 145. Along the length D2, the media 140 includes four ridges 148 and 149. A single period length of media can include four ridges. It should be understood that the ridges 148 and 149 are not the peaks 144 and 145. The media 140 can be provided so that between adjacent peaks (e.g., peaks 144 and 145) there are two ridges 148 and 149. In addition, the fluted sheet 140 can be provided so that between other adjacent peaks, there is one ridge, two ridges, or no ridge. There is no requirement that between each adjacent peak there are two ridges. There can be an absence of ridges between peaks if it is desirable to have the presence of ridges alternate or provided at predetermined intervals between adjacent peaks. In general, a pattern of flutes can be provided where the pattern of flutes repeats and includes the presence of ridges between adjacent peaks.

The ridges 148 and 149 can be characterized as the areas where a relatively flatter portion of the fluted sheet joins a relatively steeper portion of the fluted sheet. In the case of the ridge 148, a relatively flatter portion of the fluted sheet 148a joins a relatively steeper portion of the fluted sheet 148b. In the case of the ridge 149, a relatively flatter portion of the fluted sheet 149a joins a relatively steeper portion of the fluted sheet 149b. The relatively steeper portion of the fluted media can be characterized as having an angle of greater than 45° and preferably greater than about 60° when measured for that portion of the media relative to the facing sheet 143. The relatively flatter portion can be characterized as having a slope of less than 45° and preferably less than about 30° for that portion of the media relative to the facing sheet 143.

The flutes of fluted sheet 142 of FIG. 4c can be designed to taper from one point along the media to a second point. It is desirable, in general, to have this taper substantially preserve the radius of at the peak 145 of the flute. This radius can be preserved, for example, by having portions 148b and 149b of the fluted media effectively move sideways (in and out) so as to create a tapered flute. Such movement can change the cross sectional area of the flute, while preserving the flute width D1 and preserving the peak 145. Thus, the relatively flatter portion 149a will get longer and shorter along the flute, the length of the steeper portions 148b and 149b will move in and out (left and right on FIG. 4b). It will be noted, as stated above, that in some implementations the inclined flat portions along the peaks that move inward and downward as the flute cross sectional area decreases.

The fluted sheet 142 can be considered more advantageous to prepare relative to the fluted sheet 122 because the wrap angle of the fluted sheet 142 can be less than the wrap angle for the fluted sheet 122. In general, the wrap angle refers to the sum of angles resulting in media turns during the step of fluting. In the case of the fluted media 142, the media is turned less during fluting compared with the fluted media 122. As a result, by fluting to form the fluted sheet 142, the required tensile strength of the media is lower compared with the fluted sheet 122. This lower wrap angle can be particularly important with tapered media, making the fluted sheet 142 of FIG. 4C particularly well suited to being tapered.

The fluted sheets 112, 122, and 142 are shown as relatively symmetrical from peak to peak. That is, for the media 112, 122, and 142, the flutes repeat having the same number of ridges between adjacent peaks. Adjacent peaks refer to the peaks next to each other along a length of fluted media. For example, for the fluted media 112, peaks 114 and 115 are considered adjacent peaks, and peaks 114 and 116 can be considered adjacent same side peaks. A period of media, however, need not have the same number of ridges between adjacent peaks, and the media can be characterized as asymmetrical in this manner. That is, the media can be prepared having a ridge on one half of the period and not having a ridge on the other half of the period.

By providing a single ridge or multiple ridges between adjacent peaks of the fluted media, the distance D2 can be increased relative to prior art media such as standard A and B flutes. As a result of the presence of a ridge or a plurality of ridges, it is possible to provide filtration media having more media available for filtration compared with, for example, standard A flutes and B flutes. The previously described measurement of media-cord percentage can be used to characterize the amount of media provided between adjacent peaks. The length D2 is defined as the length of the fluted sheet 112, 122, and 142 for a period of the fluted sheet 112, an 122, and 142. In the case of the fluted sheet 112, the distance D2 is the length of the fluted sheet from the lower peak 114 to the lower peak 116. This distance includes two ridges 118. In the case of the fluted sheet 122, the length D2 is the distance of the fluted sheet 122 from the lower peak 124 to the lower peak 126. This distance includes at least four ridges 128 and 129. The existence of increased filtration media between adjacent peaks as a result of providing one or more crease between the adjacent peaks can be characterized by the media-cord percentage. As discussed previously, standard B flutes and standard A flutes have a media-cord percentage of about 3.6% and about 6.3%, respectively. In general, low contact flutes such as the flute design shown in FIG. 4a can exhibit a media-cord percentage of about 6.2% to about 8.2%. Low strain flutes such as the flute designs shown in FIGS. 4b and 4c can provide a media-cord percentage of about 7.0% to about 16%.

Another advantage to providing for the presence of the ridges (e.g., 118, 128, and 129) is that these ridges help reduce stress on the media to provide a smaller masking area at the peaks. In general, without the ridges being formed during the process of fluting, a greater amount of tension or memory in the media may cause the peaks to exhibit a greater level of masking. By introducing the ridges into the filtration media when fluting the filtration media, it becomes easier to create and help maintain a relatively low radius for the peaks to reduce masking.

Figure 5:
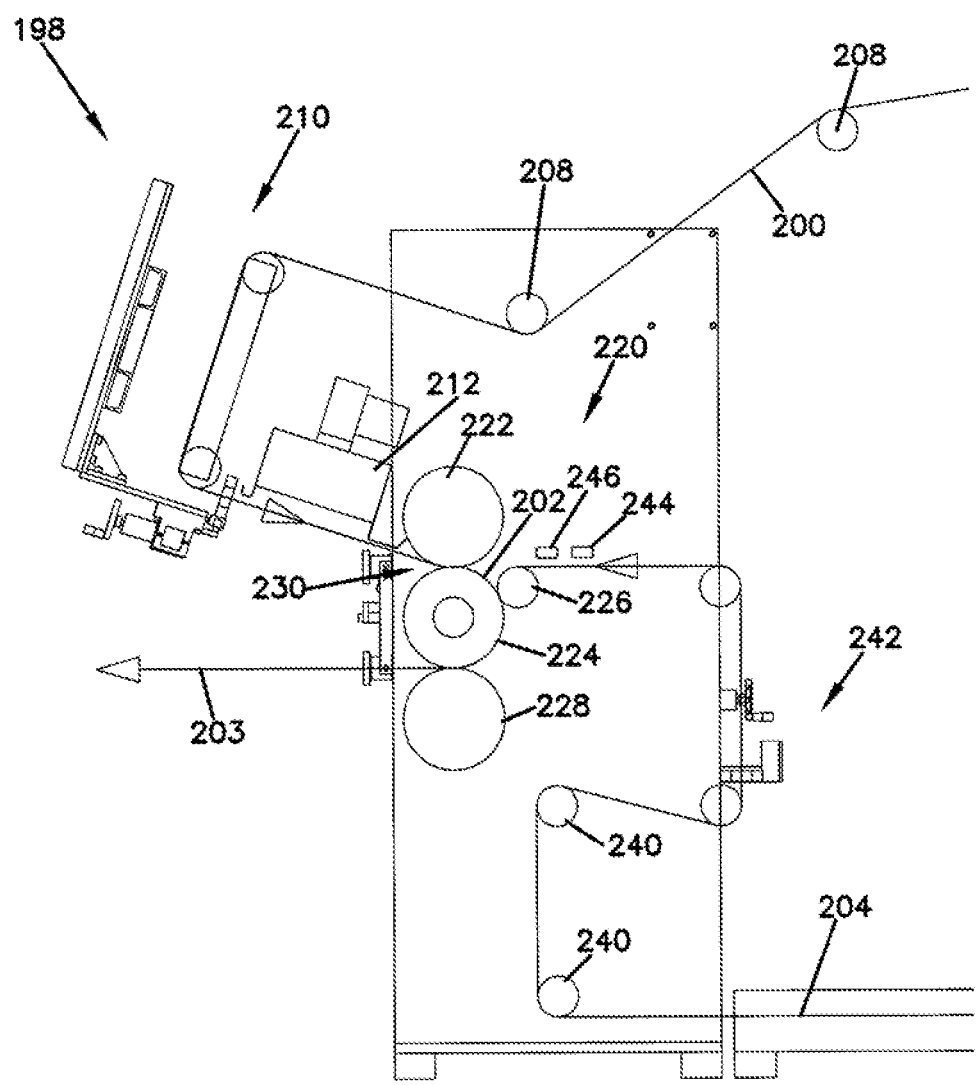
FIG. 5 is a diagrammatic view showing the production of fluted media according to the present invention using an example apparatus.

Now referring to FIG. 5, an exemplary process for forming fluted media and single facer media is shown by a schematic representation at reference number 198. In this schematic representation, media 200 is fluted to form fluted media 202. The fluted media 202 can be combined with the facing media 204 to form single facer media 203.

The media 200 travels across the guide rolls 208 and is steered into a desired or correct position as a result of the steering unit 210. A heater 212 can be provided to heat the media 200 to a desired temperature. In general, it may be desirable to heat the media 200 to avoid cracking as a result of the fluting process. It should be understood that it is not necessary to utilize a heater. In addition, a unit can be used to control the humidity of the water content of the media 200. The humidity control unit can be used in place of or in combination with the heater 212. The heater 212 can be provided to heat the media 200 to the temperature of about 120° F. to about 150° F.

The media 200 enters the fluting rolls 220 to provide the fluted media 202. The fluting rolls 220 include a first roll 222 and a second roll 224. The first roll 222 can be referred to a coining roll, and the second 224 can be referred to a receiver roll. Additionally included as part of the fluting rolls 220 are a first pressure roll 226 and a second pressure roll 228. For the orientation of the fluting rolls 220 shown, the coining roll 222 can be referred to as the top roll, and the receiver roll 224 can be referred to as the bottom roll. Of course, this orientation can be reverse, if desired. As the media 200 enters the bite 230 between the coining roll 222 and the receiver roll 224, the media 200 is deformed to provide fluted media 202 having a pattern of flutes with a desired shape. In the arrangement of the fluting rolls 220 shown, the media 200 travels in the machine direction, and the coining roll 222 and the receiver roll 224 extend in the transverse direction so that the flutes extend in the transverse direction. The transverse direction refers to a direction transverse to the machine direction. The arrow along the media 200 shows the machine direction. While the fluting rolls 220 shown provide flutes extending in the transverse direction, it should be understood that alternative arrangements can be provided so that the flutes extend in the machine direction.

Facing media 204 travels along guide rolls 240. A steering unit 242 steers the facing media 204 onto the first pressure roll 226. A tack bead can be applied to the facing media 204 at the tack bead applicator 244, and the sealing bead can be applied to the facing media 204 at the sealing bead applicator 246. The fluted media 202 and the facing media 204 join together where the first pressure roll 226 engages the receiver roll 224. A second pressure roller 228 is provided to hold the fluted media 202 to the facing media 204. The resulting single facer media 203 can be used to provide a filter media construction.

Figure 6:
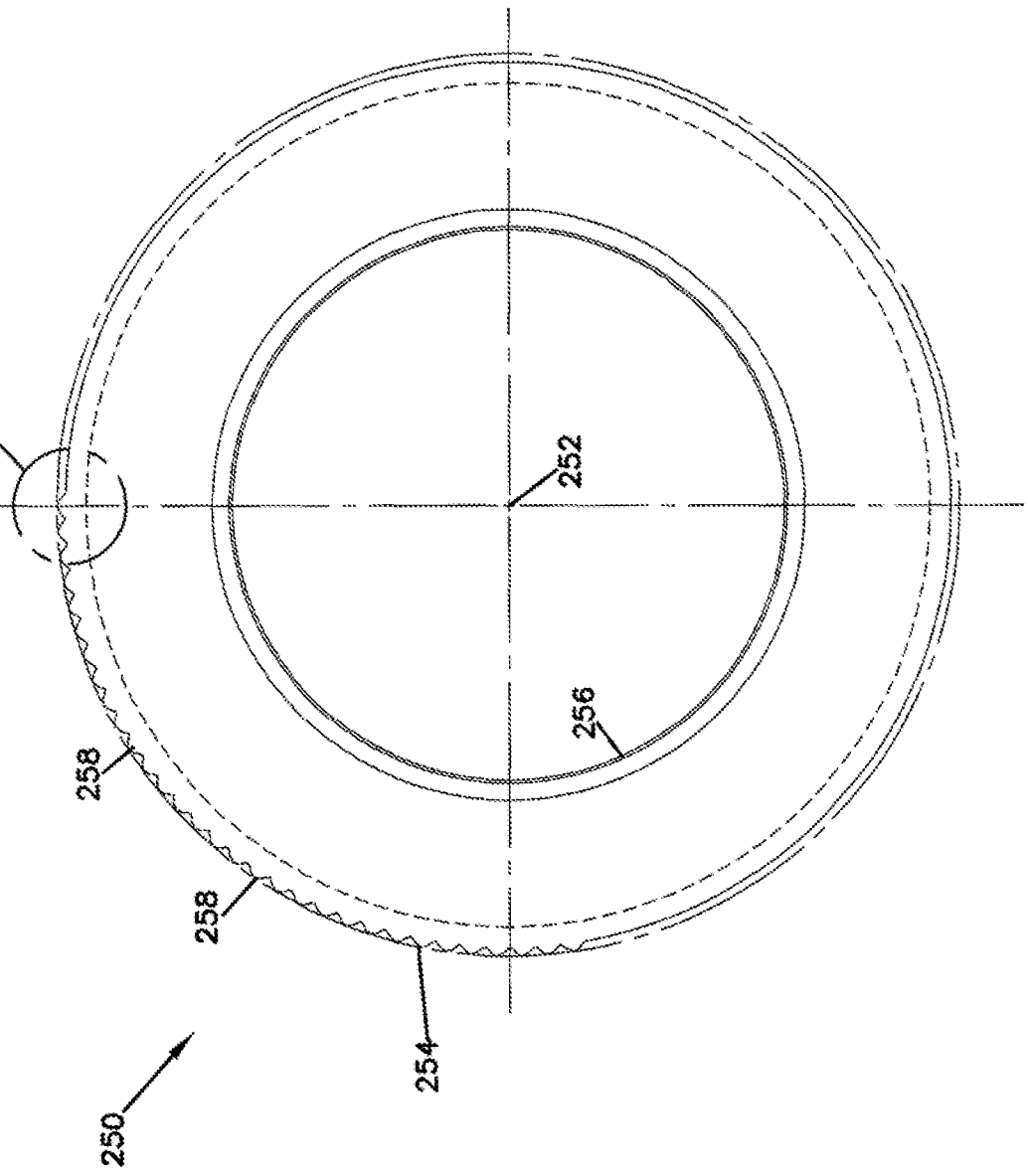
FIG. 6 is a sectional view of a coining roll (also called a coining wheel) for forming fluted media according to the present invention.
Figure 7:
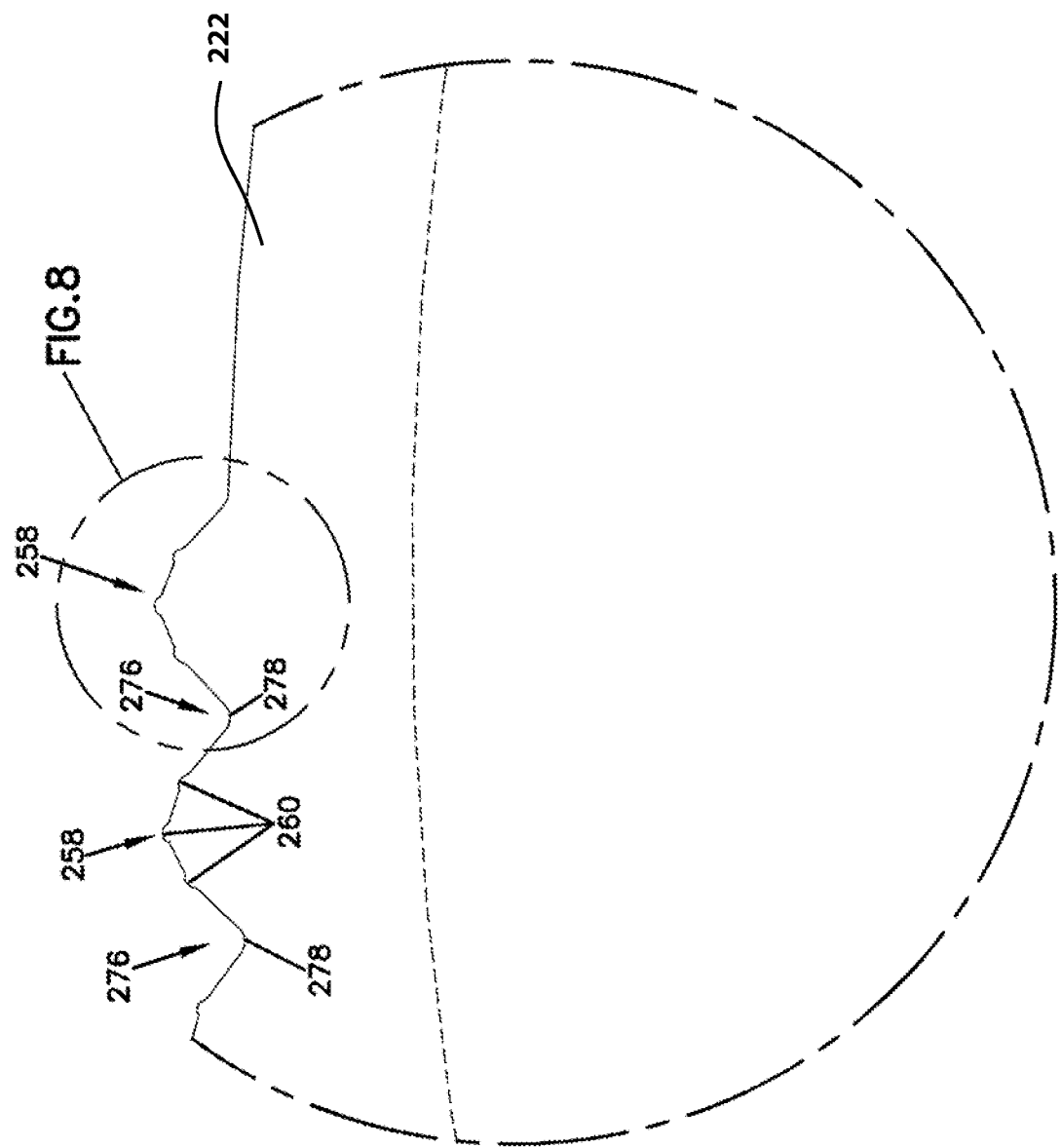
FIG. 7 is an enlarged, partial, sectional, view of a portion of the coining roll shown in FIG. 6.
Figure 8:
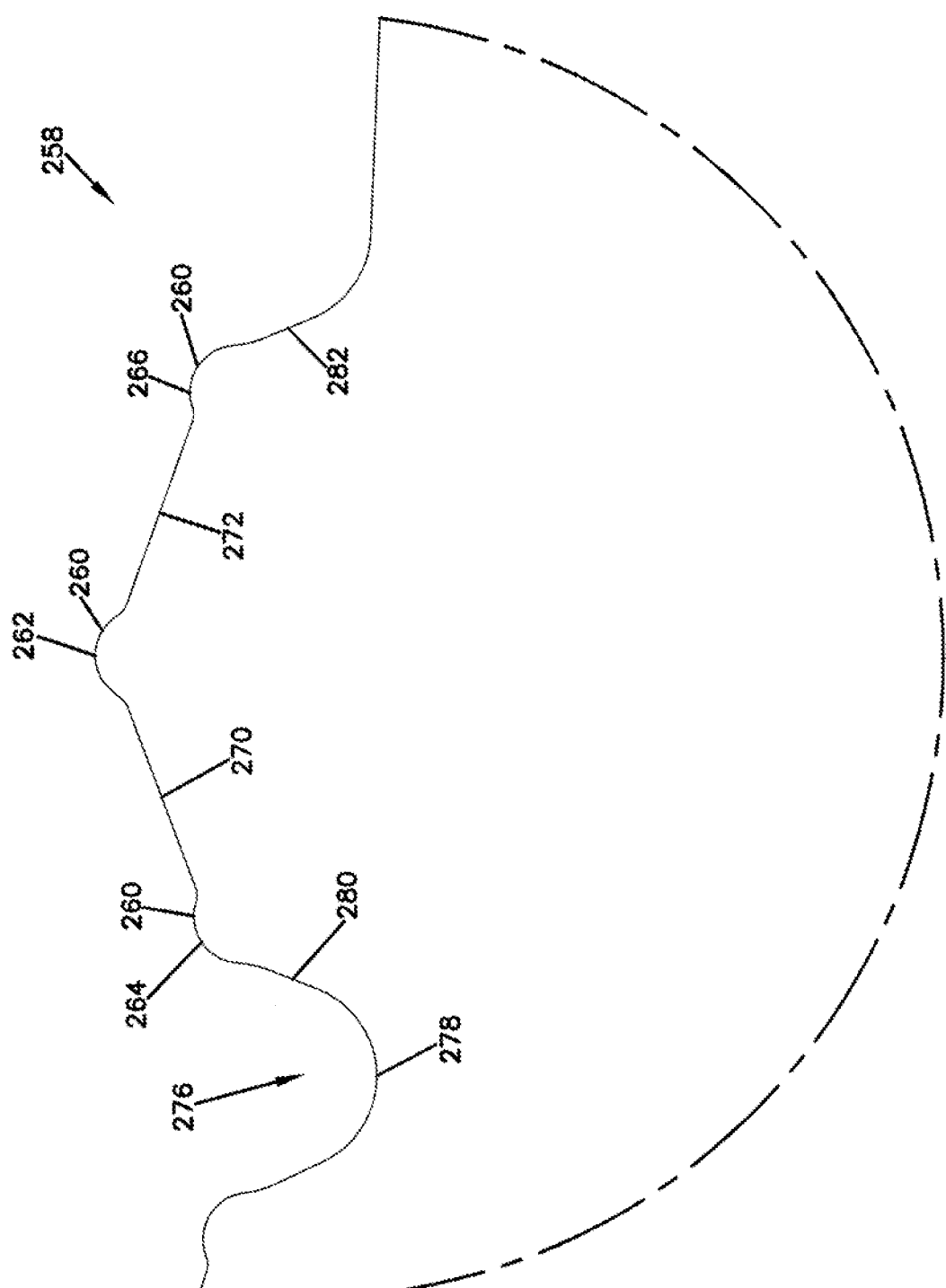
FIG. 8 is an enlarged, partial, sectional view of a portion of the coining roll shown in FIG. 7.

Now referring to FIGS. 6-8, a first roll or coining roll is shown at reference number 250. The coining roll 250 can be used as the coining roll 222 in the fluting rolls 220 shown in FIG. 5. The first roll 250 rotates about an axis to 252, and includes an exterior surface or circumference 254 that, when combined with the receiver roll or wheel 224, provides fluting of filtration media. The coining roll 222 can include an interior surface 256 upon which the coining roll 222 can be mounted. The exterior surface 254 includes a plurality of coining roll projections 258. FIG. 6 only shows a portion of the coining roll projects 258 extending around the circumference of the coining roll 250. The coining roll 250 can include about 30 to about 650 coining roll projections 258 spaced around the exterior surface or circumference 254. It should be understood that the number of coining roll projections 258 provided on the coining roll 250 can be provided depending upon the diameter of the coining roll and the desired pitch or peak to peak distance between each coining roll projection. For example, a coining roll can have a minimum diameter of about 4.5 inches and a maximum diameter of about 40 inches.

Details of coining roll projections 258 are shown in FIGS. 7 and 8. The coining roll projections 258 shown include three media contact areas 260 that are provided for engaging the media that enters the bite 230. Although the coining roll projections 258 are shown having three media contact areas 260, the coining roll projections can be provided having two media contact areas in at least one embodiment. As depicted, one of the media contact areas 260 can be referred to as a peak contact area 262, and two of the media contacting areas 260 can be referred to as first and second ridge contact areas 264 and 266. The peak contact area 262 can be provided for forming the peak 115, and the first and second ridge contact areas 264 and 266 can provide the ridges 118 for the fluted media shown in FIG. 4a. In some implementations, media contact areas 260 can be present on both the first and second roller.

A first media relaxation area 270 can be provided between the peak contact area 262 and the first ridge contact area 264, and a second media relaxation area 272 can be provided between the peak contact area 260 and the second ridge contact area 266. In general, the first and second media relaxation areas 270, 272 are defined by the distance between the coining roll projections that is larger than the thickness of the media. The first media relaxation area 270 and the second media relaxation area 272 provide the media with freedom of movement between the peak contact area 262 and the first and second ridge contact areas 264 and 266. By providing media relaxation areas, it is possible for the filtration media to move and thereby relieve stress on the media. As the rolls rotate and the media is fed into the bite 230, the filtration media can avoid being subjected to undo tension as a result of the presence of the media relaxation areas, and can avoid tearing.

The media contact areas 260 are provided to engage and turn the media, but should not have a radius that is too small so they cut the media. In general, the media contact areas can have a radius of at least about 0.01 inch. The radius of the contact areas can be as large as about one third of the flute height J. In general, it is desirable to provide a crease, bend, or fold in the media, but it is not desirable to cut the media as a result of fluting. The upper limit of the radius of the media contact areas 260 can be characterized as a radius that results in a media contact area that fails to provide the desired degree of turning of the media so that the media tends to reform to its original flat shape. It is desirable for the media to become deformed as a result of being fed into the bite between the first and second rolls.

If the media contact area is too large (has a radius that is too large), then the desired fluted sheet may not result. The media contact areas 260 can be referred to as nips. The media relaxation areas can be referred to as gaps. In general, it is desirable for the filtration media to be able to move in the media relaxation areas in order to reduce or relieve the stress on the media resulting from turning the media as a result of contact with the media contact area 260. The general length of the relaxation area or the gaps is the distance between the media contact areas, or nips. In one embodiment, the relaxation area is at least greater than about 25% of the flute arc length.

The coining roll 250 includes a series of coining roll recesses 276 provided between the flute projections 258. In general, the coining roll recesses 276 allow for the formation of the peaks 114 and 116 of the media shown in FIG. 4. The coining roll recesses 276 can be found between each of the coining roll projections 258. In addition, the coining roll recesses 276 include a bottom contact area 278 that receives or contacts the media. In general, the area of the roll extending from the bottom contact area 278 to the first ridge contact area 264 can be referred as the first media relaxation area 280, and the area of the roll extending from the bottom recess area 278 to the second ridge contact area 266 can be referred as the second media relaxation area 282. In general, the first media relaxation area 280 and the second media relaxation area 282 are provided so that the media has a degree of freedom of movement in those areas.

Figure 9:
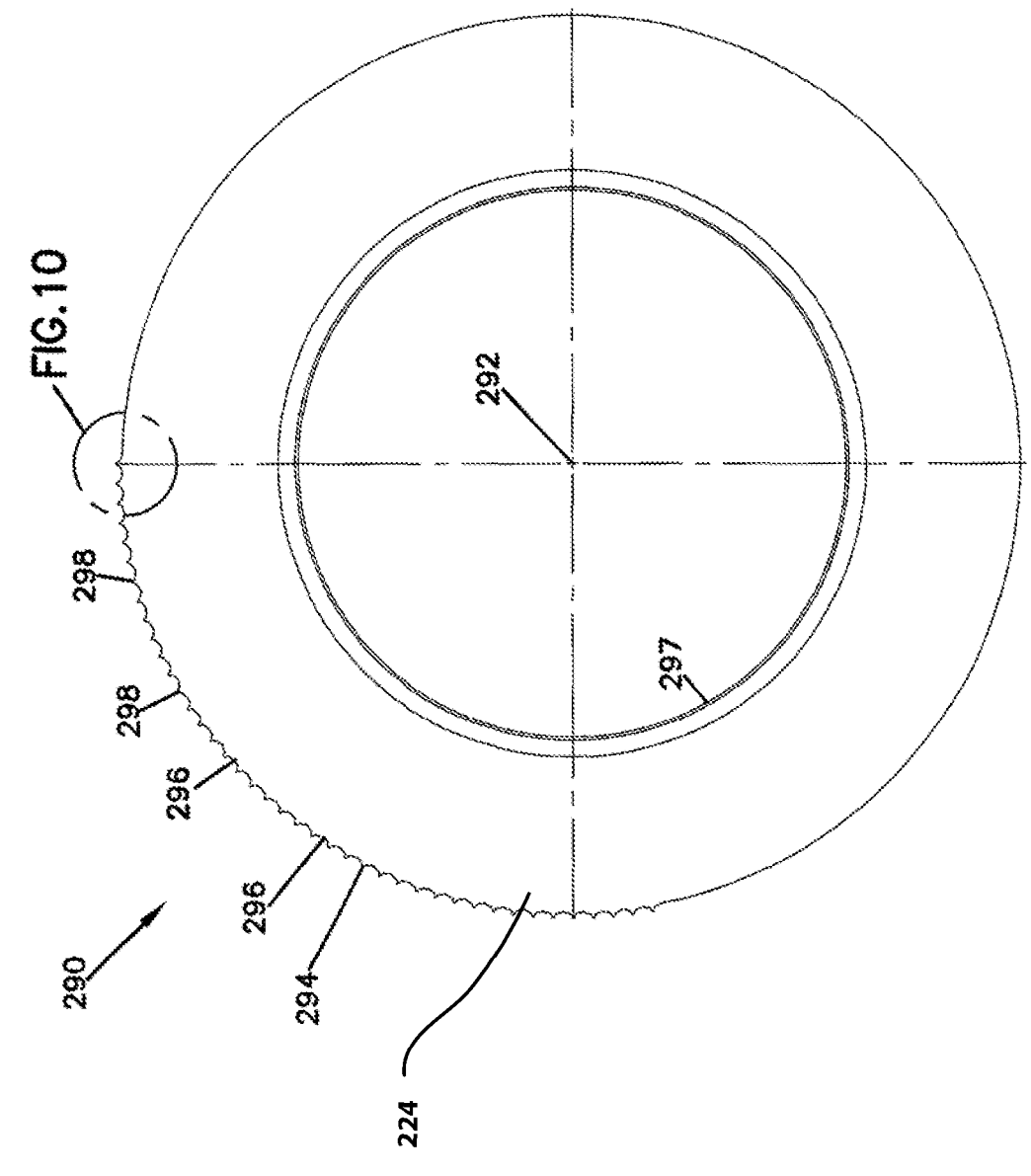
FIG. 9 is a sectional view of a coining roll for forming fluted media according to the present invention.
Figure 10:
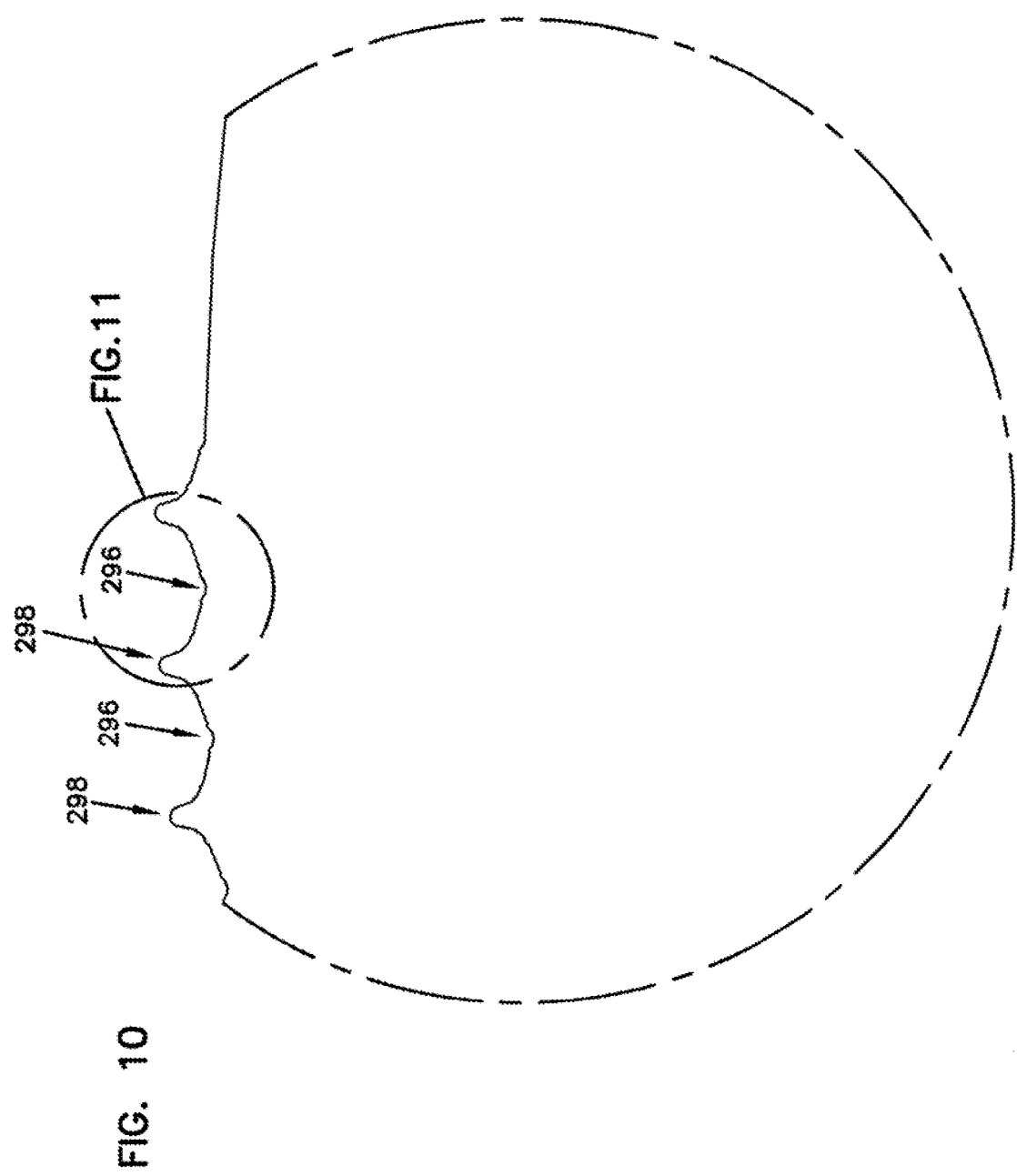
FIG. 10 is an enlarged, partial, sectional view of a portion of the receiver roll (als called a receiver wheel) shown in FIG. 9.
Figure 11:
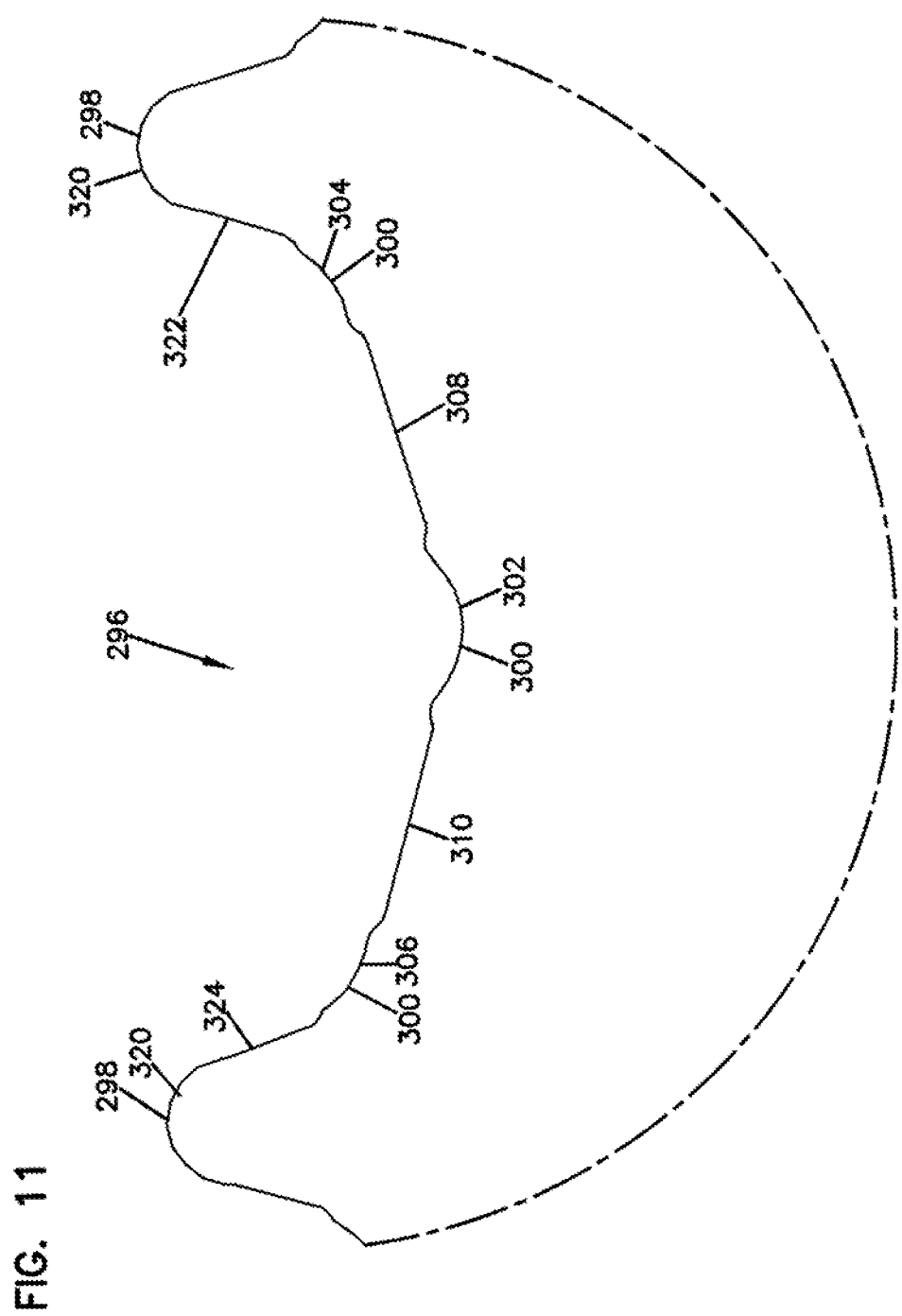
FIG. 11 is an enlarged, partial, sectional view of a portion of the receiver roll shown in FIG. 10.

Now referring to FIGS. 9-11, a second roll or receiver roll is shown at reference number 290. The receiver roll 290 can be the receiver roll 224 shown in the fluting rolls 220 of FIG. 5. The receiver roll 290 rotates about an axis 292, and includes an exterior surface or circumference 294 and an interior surface 297. The receiver roll 290 can be supported by the interior surface 297. The exterior surface 294 includes a plurality of receiver roll recesses 296 and receiver roll projections 298. In general, the receiver roll 290 includes an exterior surface 294 having alternating receiver roll recesses 296 and receiver roll projections 298.

The receiver roll recesses 296 include contact areas 300. The contact areas 300 can be referred to as peak contact area 302 and first and second ridge contact areas 304 and 306. A first media relaxation area 308 can be provided extending between the peak contact area 302 and the first ridge contact area 304. A second media relaxation area 310 can be provided extending between the first peak contact area 302 and the second ridge contact area 306. The media relaxation areas 308 and 310 are provided to allow the media to move during the flute forming process. The receiver roll projections 298 include media contact areas 320. In addition, the receiver roll 290 includes first media relaxation 322 provided extending between the first ridge contact area 304 and the media contact area 320, and second media relaxation area 324 extending between the second ridge contact area 306 and the media contact areas 320.

In a conventional corrugation process, a substrate is corrugated as a result of movement of the substrate into a bite between two rolls or wheels where each roll or wheel has teeth and recesses where teeth on one wheel engage the recesses on the other wheel and vise versa. The teeth and recesses on rolls or wheels in a conventional corrugation process may be relatively symmetrical so that a relatively symmetrical corrugation results. In contrast, the rolls 250 and 290 can be considered to have teeth and recesses that are not symmetrical.

The coining roll 250 has coining roll projections 258 that can be considered a form of teeth, and coining roll recesses 276 that can be considered a form of recess. Similarly, the receiver roll 290 includes receiver roll recesses 296 that can be considered a type of recess, and receiver roll projections 298 that can be considered at type of teeth. During operation, the coining roll projections 258 engage the receiver roll recesses 298, and the receiver roll projections 298 engage the coining roll recesses 276. This operation is illustrated in FIG. 12 where a coining roll 250 and a receiver roll 290 engage a filtration media 310 to create fluted filtration media 312.

In a conventional corrugating process, such as a corrugation process used to form A flutes and B flutes, the corrugation rolls can be considered relatively symmetrical. Relatively symmetrical rolls are rolls where one roll (e.g., the top roll) has teeth and recesses that are similar to the teeth and recesses on the other roll (e.g., the bottom roll). Because the rolls on a conventional corrugation process are symmetrical, the resulting flutes are generally symmetrical. By providing rolls that are non-symmetrical, the performance of the resulting filtration media can be enhanced. The coining roll 250 and the receiver roll 290 can be considered non-symmetrical with respect to the structure of the projections or teeth and the recesses. Although the coining 250 and the receiver roll 290 can be considered symmetrical with respect to period length, the structure of the projections and the recesses are different on the two rolls and, therefore, the rolls can be considered non-symmetrical. In a variety of embodiments, the corrugation rolls are configured such that the resulting media has a substantially equal arc length along the length of the media. Such a configuration can reduce strain exerted on the media during manufacturing.

It should be understood that the terms "coining roll" and "receiver roll" are relatively arbitrary. It is the combination of the coining roll and the receiver roll that provides for the presence of ridges along at least a portion of the flute length. Accordingly, by providing both rolls with media contact areas that engage the filtration media on opposite sides of the filtration media to create a ridge or crease or bend, it is the combined effort of the rolls that creates the repeating pattern of flutes in the filtration media. Furthermore, by characterizing of the rolls as a coining roll, it is not meant to exclude the possibility of the other roll (e.g., the receiving roll) from having projections that engage recesses on the coining roll to create ridges, bends, or creases in the filtration media. For example, the characterization of the first roll as having a plurality of first roll projections does not mean that the first roll projections extend the entire length of the roll. It may be desirable to have the first roll projections only extend a length of the roll. Furthermore, any of the first roll recesses, the second roll projections, and the second roll recesses may extend a portion of the roll less than the entire length of the roll. By way of example, the projections and recesses may extend a length of the roll corresponding to at least 30% of the flute length, at least 50% of the flute length, at least 60% of the flute length, at least 80% of the flute length, or the entire flute length.

The above specification provides a complete description of the manufacture and use according to the present invention. Since many embodiments of the invention can be made without departing from the spirit and scope of the invention, the invention resides in the claims hereinafter appended.

We claim:
1. An apparatus for forming fluted media comprising:
(a) a first roll comprising a plurality of first roll projections and first roll recesses wherein the first roll provides alternating first roll projections and first roll recesses and wherein at least one of the first roll projections comprises at least two media contact areas separated by a media relaxation area;

(b) a second roll comprising a plurality of second roll recesses and second roll projections wherein the second roll provides alternating second roll recesses and second roll projections; and (c) the first roll projections, the first roll recesses, the second roll recesses, and the second roll projections are constructed to interact to provide a bite, that, when filtration media passes through the bite, provides the filtration media with a repeating pattern of flutes wherein the repeating pattern of flutes comprises a tapered cross sectional area;

wherein the media contact areas of the first roll comprise a peak contact area configured to form a sharp peak in the fluted media and a ridge contact area configured to form a ridge in the fluted media, the peak being the highest point on the flute and the ridge having a height less than the height of the peak, the peak contact area and ridge contact area providing a coining force between second roll projections on the second roll; and wherein the media relaxation area of the first roll is defined by the distance between the media contact areas having a gap between the first and second rolls that is greater than the thickness of the media to be fluted.

2. An apparatus according to claim 1, wherein the first roll projections, the first roll recesses, the second roll recesses, and the second roll projections are constructed to interact to provide a bite that, when filtration media passes through the bite, provides the filtration media with a repeating pattern of flutes, wherein each flute comprises at least one peak, wherein the repeating pattern of flutes comprises at least one flute having at least two ridges provided in a flute period between adjacent same side peaks.

3. The apparatus according to claim 1, wherein at least one of the first roll projections comprises at least three media contact areas separated from each other by media relaxation areas.

4. The apparatus according to claim 1, wherein at least one of the second roll recesses includes at least two media contact areas separated by a media relaxation area.

5. The apparatus according to claim 1, wherein at least one of the second roll recesses includes at least three media contact areas separated from each other by media relaxation areas.

6. The apparatus according to claim 1, wherein the apparatus is configured to form a ridge in the filtration media as a result of compression between a first roll projection media contact area and a second roll recess media contact area.

7. The apparatus according to claim 1, wherein the first roll recesses and projections and the second roll recesses and projections are arranged so as to result in equal arc lengths along the length of fluted media formed using the apparatus.

8. The apparatus according to claim 1, wherein the first roll and the second roll are constructed to compress filtration media between first roll projection media contact areas and second roll recess media contact areas.

9. The apparatus according to claim 1, wherein the first roll comprises about 30 to about 650 first roll projections and about 30 to about 650 first roll recesses wherein the first roll provides alternating first roll projections and first roll recesses, and wherein the first roll projections comprise at least three media contact areas separated from each other by media relaxation areas.

10. The apparatus according to claim 1, wherein the second roll comprises about 30 to about 650 second roll projections and about 30 to about 650 second roll recesses wherein the second roll provides alternating second roll projections and second roll recesses, and wherein the second roll recesses comprise at least three media contact areas separated from each other by media relaxation areas.

11. The apparatus according to claim 1, wherein the media relaxation area is constructed to allow filtration media to move with respect to the first roll, when filtration media passes through the bite.

12. The method for forming fluted media of claim 1, wherein the media relaxation area comprises at least 25 percent of the length of the media from a media contact area forming a first flute peak to a media contact area forming a second flute peak.

13. The method for forming fluted media of claim 1, wherein the media relaxation areas allow the media to move during the flute forming process.

\* \* \* \* \*